US 10,834,533 B2

(12) United States Patent
Goto

(10) Patent No.: US 10,834,533 B2
(45) Date of Patent: Nov. 10, 2020

(54) PROCESSING DEVICE, PROCESSING METHOD, AND PROGRAM

(71) Applicant: LAC CO., LTD., Tokyo (JP)

(72) Inventor: Etsuo Goto, Nissin (JP)

(73) Assignee: LAC CO., LTD., Tokyo (JP)

(*) Notice: Subject to any disclaimer, the term of this patent is extended or adjusted under 35 U.S.C. 154(b) by 0 days.

(21) Appl. No.: 16/568,926

(22) Filed: Sep. 12, 2019

(65) Prior Publication Data
US 2020/0008012 A1 Jan. 2, 2020

Related U.S. Application Data

(63) Continuation of application No. PCT/JP2018/008273, filed on Mar. 5, 2018.

(30) Foreign Application Priority Data

Mar. 27, 2017 (JP) .................. 2017-061263

(51) Int. Cl.
H04W 4/02 (2018.01)
B60R 25/24 (2013.01)
(52) U.S. Cl.
CPC ............. *H04W 4/023* (2013.01); *B60R 25/24* (2013.01)
(58) Field of Classification Search
CPC ................................................... H04W 4/023
(Continued)

(56) References Cited

U.S. PATENT DOCUMENTS

2009/0265046 A1 10/2009 Sekiyama et al.
2010/0073201 A1 3/2010 Holcomb et al.
(Continued)

FOREIGN PATENT DOCUMENTS

CN 101351361 A 1/2009
JP 2003-058971 2/2003
(Continued)

OTHER PUBLICATIONS

International Search Report, dated Apr. 3, 2018, in International Application No. PCT/JP2018/008273.

*Primary Examiner* — Joel Ajayi
(74) *Attorney, Agent, or Firm* — Greenblum & Bernstein, P.L.C.

(57) ABSTRACT

A processing device includes a remote-controllable device position information acquisition unit that acquires information on a position of a remote-controllable device, a relative positional relationship information acquisition unit that acquires information on a relative positional relationship between a terminal device transmitting instructions to request control regarding the remote-controllable device via another device having a communication function not included in either the processing device or the remote-controllable device by communicating with the other device, and the remote-controllable device, a determination unit that determines if each condition regarding the position of the remote-controllable device and a condition regarding the relative positional relationship is satisfied on the basis of the acquired information, and determines whether to permit the terminal device to perform the control regarding the remote-controllable device according to a result of the determination, and a control unit that performs control.

14 Claims, 12 Drawing Sheets

(58) Field of Classification Search
USPC .................................................... 455/456.1
See application file for complete search history.

(56) References Cited

U.S. PATENT DOCUMENTS

| | | | |
|---|---|---|---|
| 2011/0309933 A1* | 12/2011 | Marino | G01S 5/0252 340/539.32 |
| 2013/0151038 A1 | 6/2013 | Harumoto et al. | |
| 2017/0249792 A1* | 8/2017 | Gennermann | B60R 25/24 |

FOREIGN PATENT DOCUMENTS

| | | |
|---|---|---|
| JP | 2004-196058 | 7/2004 |
| JP | 2005-516482 | 6/2005 |
| JP | 2005-225251 | 8/2005 |
| JP | 2008-037215 | 2/2008 |
| JP | 2010-078602 | 4/2010 |
| JP | 2013-032105 | 2/2013 |
| JP | 2013-123097 | 6/2013 |
| JP | 2016-055687 | 4/2016 |
| JP | 2017-033343 | 2/2017 |
| WO | 03/063448 A1 | 7/2003 |
| WO | 2006/038290 A1 | 4/2006 |

\* cited by examiner

| MOBILE ID | TERMINAL ID | CONDITION TARGET | CONDITION |
|---|---|---|---|
| 0001 | 0011 | POSITION OF MOBILE | CONDITION A1 |
| | | DISTANCE | CONDITION B1 |
| 0001 | 0012 | POSITION OF MOBILE | CONDITION A2 |
| | | DISTANCE | CONDITION B2 |
| 0002 | 0056 | POSITION OF MOBILE | CONDITION A3 |
| | | DISTANCE | CONDITION B3 |
| ⋮ | ⋮ | ⋮ | ⋮ |

2011

US 10,834,533 B2

PROCESSING DEVICE, PROCESSING METHOD, AND PROGRAM

This application is a Continuation of PCT/JP2018/008273 filed Mar. 5, 2018, the contents of which is expressly incorporated by reference herein in its entirety.

TECHNICAL FIELD

The present invention relates to a processing device, a processing method, and a program.

Priority is claimed on Japanese Patent Application No. 2017-061263, filed Mar. 27, 2017, the content of which is incorporated herein by reference.

BACKGROUND ART

In the related art, not only computers having a communication function, but also the Internet of Things (IoT) in which various objects have a communication function and perform communication via the Internet using the communication function have been developed.

For example, a car (a so-called connected car) having a communication function of performing communication via the Internet can be connected to the Internet and, for example, can transmit information on the car to a predetermined information collection device via the Internet.

Further, control of an object such as a car using a portable terminal device (a device of a portable terminal) remote from the object has also been developed.

As an example, in a vehicle control system described in Patent Literature 1, a control electronic control unit (ECU) controls a vehicle device on the basis of behavior pattern information of a user stored in a behavior database and a positional relationship between a current position of a portable terminal and a current position of the vehicle. Accordingly, in the vehicle control system, the vehicle device is optimally controlled in consideration of the behavior pattern of the user and a positional relationship between the user carrying the mobile terminal and the vehicle (see Patent Literature 1).

CITATION LIST

Patent Literature

[Patent Literature] Japanese Unexamined Patent Application, First Publication No. 2008-37215

SUMMARY OF INVENTION

Technical Problem

However, in the related art, security is still insufficient when control regarding an object such as a car (herein referred to as a "mobile" in the present specification) is performed by a terminal device.

In view of such circumstances, an embodiment of the present invention provides a processing device, a processing method, and a program capable of improving security when control regarding a remote-controllable device such as a mobile is performed by a terminal device.

Solution to Problem

A processing device according to an embodiment of the present invention includes a remote-controllable device position information acquisition unit that acquires information on a position of a remote-controllable device; a relative positional relationship information acquisition unit that acquires information on a relative positional relationship between a terminal device having a function of transmitting instructions to request control regarding the remote-controllable device via another device having a communication function not included in either the processing device or the remote-controllable device by communicating with the other device, and the remote-controllable device; a determination unit that determines whether or not each of a condition regarding the position of the remote-controllable device and a condition regarding the relative positional relationship is satisfied on the basis of the information acquired by the remote-controllable device position information acquisition unit and the information acquired by the relative positional relationship information acquisition unit, and determines whether or not to permit the terminal device to perform control regarding the remote-controllable device according to a result of the determination; and a control unit that performs control based on whether or not to permit the terminal device to perform control regarding the remote-controllable device on the basis of a result of the determination of the determination unit.

In the processing device according to an aspect of the present invention, the instruction to request the control regarding the remote-controllable device that is transmitted from the terminal device may be transmitted from the terminal device via the Internet or another network.

In the processing device according to an aspect of the present invention, there may be two or more terminal devices capable of performing control on one remote-controllable device.

In the processing device according to an aspect of the present invention, there may be a plurality of items of the control regarding the remote-controllable device, and the determination unit may determine, for each of the items, whether or not to permit the terminal device to perform the control regarding the remote-controllable device.

A processing method according to an embodiment of the present invention is a processing method that is performed in a processing device, the processing method including: acquiring, by a remote-controllable device position information acquisition unit included in the processing device, information on a position of a remote-controllable device; acquiring, by a relative positional relationship information acquisition unit included in the processing device, information on a relative positional relationship between a terminal device having a function of transmitting instructions to request control regarding the remote-controllable device via another device having a communication function not included in either the processing device or the remote-controllable device by communicating with the other device, and the remote-controllable device; determining, by a determination unit included in the processing device, whether or not a condition regarding the position of the remote-controllable device and a condition regarding the relative positional relationship have been satisfied on the basis of the information acquired by the remote-controllable device position information acquisition unit and the information acquired by the relative positional relationship information acquisition unit, and determining whether or not to permit the terminal device to perform the control regarding the remote-controllable device according to a result of the determination; and performing, by a control unit included in the processing device, control based on whether or not to permit the terminal device to perform the control regarding the remote-controllable device on the basis of a result of the determination of the determination unit.

A program according to an embodiment of the present invention is a program causing a computer constituting a processing device to execute: a function of acquiring information on a position of a remote-controllable device; a function of acquiring information on a relative positional relationship between a terminal device having a function of transmitting instructions to request control regarding the remote-controllable device via another device having a communication function not included in either the processing device or the remote-controllable device by communicating with the other device, and the remote-controllable device; a function of determining whether or not a condition regarding the position of the remote-controllable device and a condition regarding the relative positional relationship have been satisfied on the basis of the acquired information on the position of the remote-controllable device and the acquired information on the relative positional relationship between the terminal device and the remote-controllable device, and determining whether or not to permit the terminal device to perform the control regarding the remote-controllable device according to a result of the determination; and a function of performing control based on whether or not to permit the terminal device to perform the control regarding the remote-controllable device on the basis of a result of the determination.

Advantageous Effects of Invention

According to the processing device, the processing method, and the program, it is possible to improve security when the terminal device performs the control regarding the remote-controllable device such as a mobile.

DESCRIPTION OF EMBODIMENTS

Figure 1:
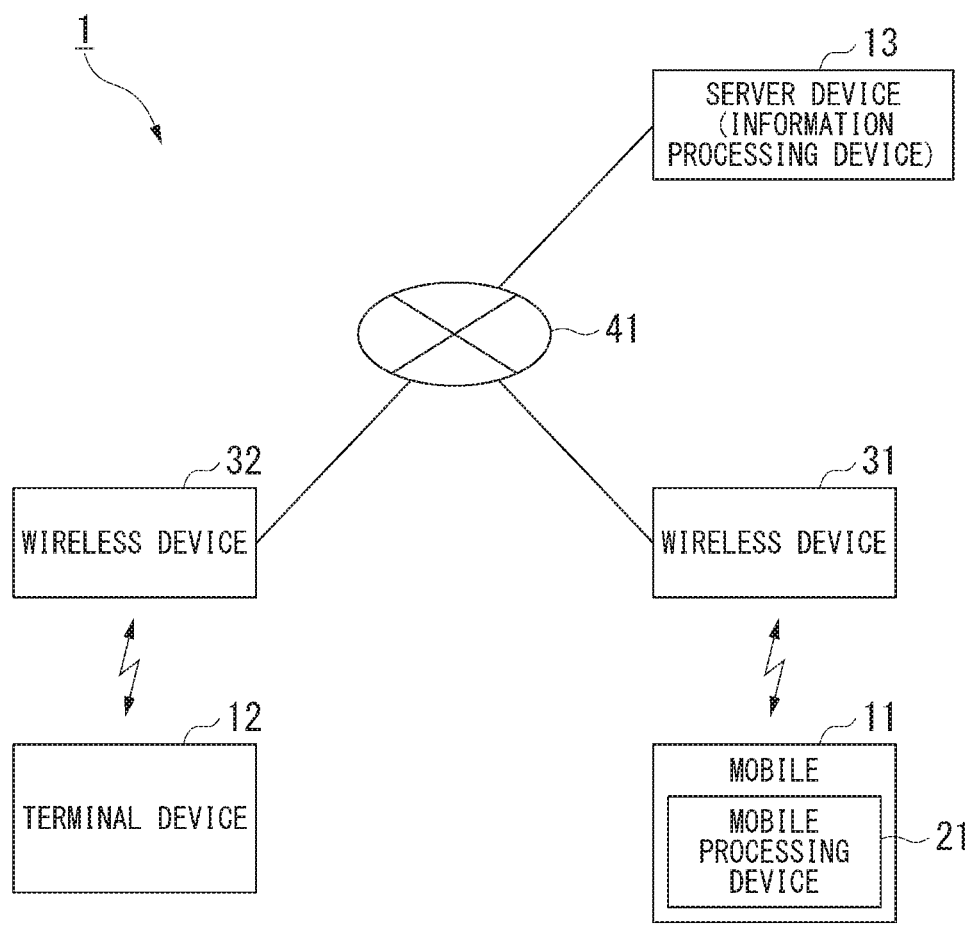
FIG. 1 is a diagram illustrating an example of a schematic configuration of a mobile processing system according to an embodiment (a first embodiment) of the present invention.

Embodiments of the present invention will be described in detail with reference to the drawings.

Although a case in which technologies according to the embodiments are applied to a car in order to avoid repeated description or redundant description will be described in the following embodiments, the following embodiments can also be applied to a case other than a car. It will be apparent to those skilled in the art that the following embodiments are also applicable to cases other than a car. As a case other than a car, a remote-controllable device other than a car may be used.

Here, the remote-controllable device is a device that can be remotely controlled by another device. Remote control of the remote-controllable device by another device means, for example, that the remote-controllable device is controlled in a non-contact state (a non-contact state) by the other device.

The remote-controllable device includes, for example, an object movable with its own power, but the present invention is not limited thereto. Examples of such an object include a car, an unmanned aircraft (a drone), and a robot that moves using power of itself.

The remote-controllable device includes, for example, an object that includes a moving mechanism such as wheels and is moved by a force (a driving force) of an external person or an external device, but the present invention is not limited thereto. Examples of such an object may include a bicycle with wheels, and a robot with wheels that does not have power of itself.

The remote-controllable device includes, for example, an object attached to an object movable with its own power and moved according to a movement of the object, but the present invention is not limited thereto. Examples of such an object include a key system included in a car (a car key opening and closing system) or an air conditioner included in the car. Such an object, for example, does not have a function of moving with its own power and does not include a moving mechanism such as wheels.

The remote-controllable device includes, for example, an object that does not have the function of moving with its own power, does not include a moving mechanism such as wheels, and is moved by a force (a driving force) of an external person or an external device, but the present invention is not limited thereto. Examples of such an object include a home appliance that does not have a function of moving with its own power and does not include a moving mechanism such as wheels, card equipment that has neither a moving function nor a moving mechanism, and portable equipment that has neither a moving function nor a moving mechanism. The equipment can be transported, for example, by an external person or an external device.

It should be noted that the remote-controllable device includes the mobile in the embodiment but is not limited to this. The mobile in the embodiment is a term used for convenience to describe the embodiment, and is an example of the remote-controllable device.

First Embodiment

[Mobile Processing System]

FIG. 1 is a diagram illustrating an example of a schematic configuration of a mobile processing system 1 according to an embodiment (a first embodiment) of the present invention.

The mobile processing system 1 includes a mobile 11, a terminal device 12, a server device 13, wireless devices 31 and 32, and a network 41.

The mobile 11 includes a mobile processing device 21.

In the first embodiment, a distance between the mobile 11 and the terminal device 12 is used as an example of relationship of a relative position (a relative positional relationship) between the mobile 11 and the terminal device 12.

In the example of FIG. 1, each of the server device 13, the wireless device 31, and the wireless device 32 is connected to the network 41. The network 41 may be a wired network, a wireless network, or a network including both the wired network and the wireless network. The server device 13, the wireless device 31, and the wireless device 32 are respectively installed at predetermined places. In the first embodiment, the server device 13, the wireless device 31, and the wireless device 32 are respectively installed at different places.

The mobile processing device 21 of the mobile 11 wirelessly communicates with the wireless device 31.

The terminal device 12 wirelessly communicates with the wireless device 32.

In the first embodiment, a case in which the mobile processing device 21 and the terminal device 12 wirelessly communicate with different wireless devices 31 and 32 is shown. However, as another example, the mobile processing device 21 and the terminal device 12 may wirelessly communicate with the same wireless device (any one of the two wireless devices 31 and 32 in the example of FIG. 1).

Here, the mobile 11 may be any object, and in the first embodiment, the mobile 11 is a car and is a so-called connected car.

It should be noted that the mobile 11 is, for example, an object that can move with power of itself (power of the mobile 11) or power provided from something other than itself (something other than the mobile 11).

As a specific example, the mobile 11 may be a car, a bicycle, a robot, or the like that moves by being driven by a drive unit included in the mobile 11, or may be a home appliance, card equipment, portable equipment, or the like that is moved by a force (a driving force) of an external person or an external device.

For example, the mobile processing device 21 may be incorporated in the mobile 11 or may be added to the mobile 11. For example, the mobile processing device 21 may be integrated with the mobile 11 or may be detachable from the mobile 11. In a configuration in which the mobile 11 and the mobile processing device 21 are integrated, for example, the mobile 11 may be regarded as having all these functions without being distinguished.

In the first embodiment, the mobile processing device 21 may be a vehicle-mounted device (vehicle-mounted equipment) included in a car.

Each of the wireless devices 31 and 32 may be any device that performs wireless communication, and may be, for example, a base device for mobile communication such as a mobile phone (which may be a smartphone) or may be another device.

The network 41 may be any network, for example, the Internet, or may partially include the Internet.

The terminal device 12 may be any device that performs wireless communication, and may be, for example, a mobile terminal device such as a mobile phone (which may be a smartphone), may be a tablet terminal device, may be a personal computer, or may be another device.

In the first embodiment, the mobile processing device 21 of the mobile 11 performs communication with the server device 13 via the wireless device 31 and the network 41, and the terminal device 12 performs communication with the server device 13 via the wireless device 32 and the network 41. The server device 13 relays the communication between the mobile processing device 21 and the terminal device 12 so that the mobile processing device 21 and the terminal device 12 perform communication.

Thus, in the first embodiment, the mobile processing device 21 and the terminal device 12 perform communication via the server device 13. In the first embodiment, the server device 13 relays the communication, and has, for example, a gateway function.

It should be noted that although one server device 13 and two wireless devices 31 are illustrated in the example of FIG. 1, the number of server devices 13 and wireless devices 31 is arbitrary. Further, any disposition may be used for a disposition (a connection relationship) of the server device 13, the wireless devices 31 and 32, and the network 41.

Further, although one mobile 11 (and one mobile processing device 21) and one terminal device 12 are illustrated in the example of FIG. 1, the number of movable bodies 11 and terminal devices 12 may be any number, which is two or more.

When one or more of the mobile 11, the mobile processing device 21, and the terminal device 12 are included in a plural number thereof, the plurality of devices may be identified using identification information (ID), for example.

[Mobile Processing Device]

Figure 2:
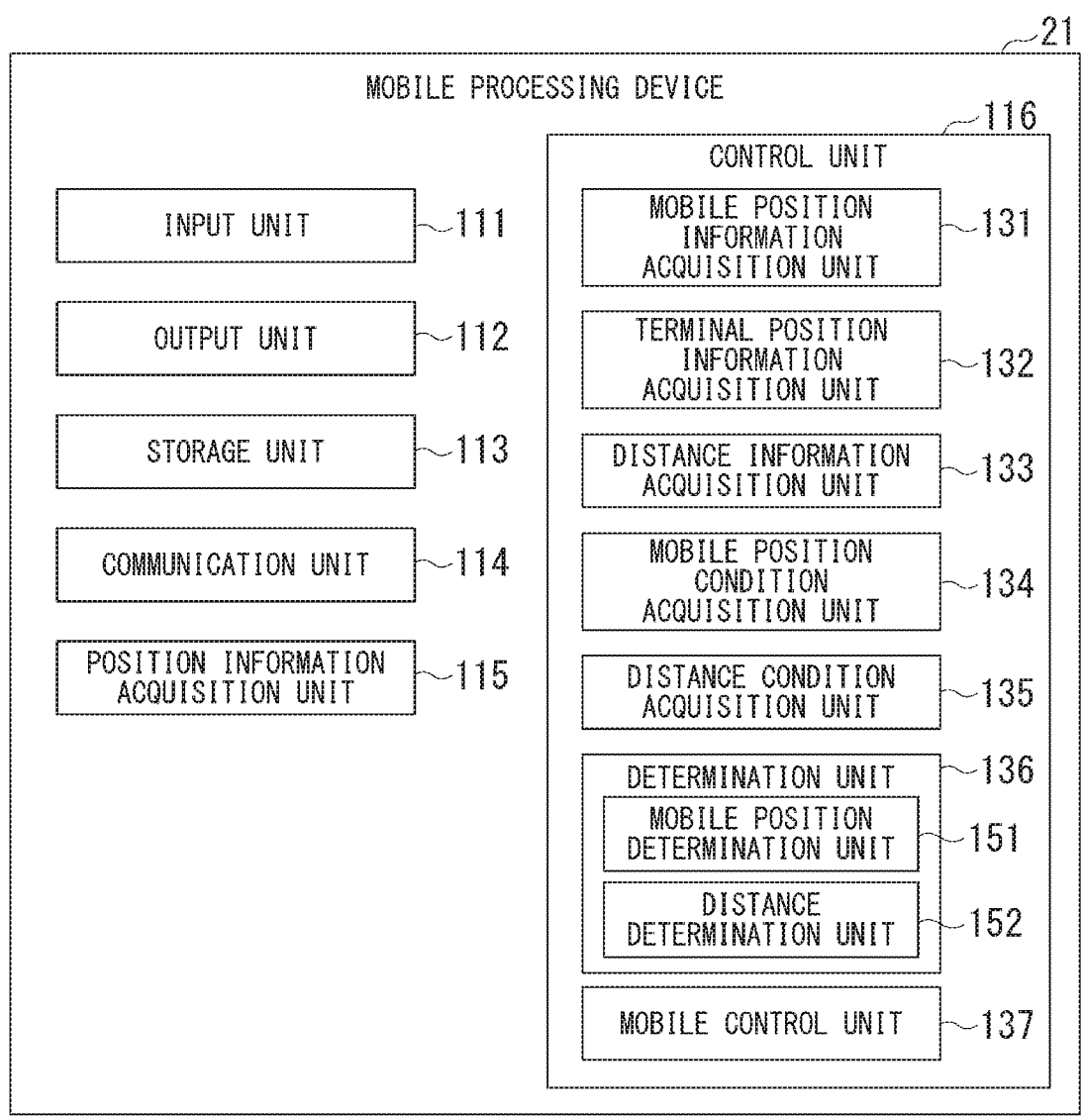
FIG. 2 is a diagram illustrating an example of a schematic configuration of a mobile processing device according to the embodiment (the first embodiment) of the present invention.

FIG. 2 is a diagram illustrating an example of a schematic configuration of the mobile processing device 21 according to an embodiment (the first embodiment) of the present invention. The mobile processing device 21 includes an input unit 111, an output unit 112, a storage unit 113, a communication unit 114, a position information acquisition unit 115, and a control unit 116.

The control unit 116 includes a mobile position information acquisition unit 131, a terminal position information acquisition unit 132, a distance information acquisition unit 133, a mobile position condition acquisition unit 134, a distance condition acquisition unit 135, a determination unit 136, and a mobile control unit 137.

The determination unit 136 includes a mobile position determination unit 151 and a distance determination unit 152.

The input unit 111 receives information from the outside. The input unit 111 includes, for example, an operation unit that receives an operation that is performed by a user (person), and receives information according to the operation received by the operation unit. Further, the input unit 111 is connected to, for example, an external device (for example, a recording medium), and receives information output from the external device.

The output unit 112 outputs information. The output unit 112 includes, for example, a screen, and displays (outputs) information on the screen. The output unit 112 is connected to, for example, an external device (for example, a recording medium), and outputs information to the external device.

The storage unit 113 stores information.

The communication unit 114 communicates information. In the first embodiment, the communication unit 114 wirelessly communicates a signal with the wireless device 31 (which may be the wireless device 32) to communicate information included in the signal.

The position information acquisition unit 115 acquires information on a position of the mobile 11. The information on the position is, for example, information for specifying the position of the mobile 11. The position information acquisition unit 115 may have a global positioning system (GPS) function as an example and acquire information on the position using this function, or may have another function and acquire the information on the position using the other function.

Here, in the first embodiment, the information acquired by the position information acquisition unit 115 may include, for example, information on a two-dimensional position on a plane such as the ground, or information on a three-dimensional position. As a specific example, the information acquired by the position information acquisition unit 115 may include one or more of latitude and longitude information, azimuth information, and altitude information. It should be noted that the information acquired by the position information acquisition unit 115 may include at least information with which a process that is performed on the basis of the information can be executed.

Here, for example, in a configuration in which the mobile processing device 21 including the position information acquisition unit 115 that acquires information on a position is added to the mobile 11, accurately, the position information acquisition unit 115 may be considered to acquire information on a position of the position information acquisition unit 115, but it is assumed in the first embodiment that the position specified by the information acquired by the position information acquisition unit 115 is the position of the mobile 11.

It should be noted that, for example, when the mobile 1 and the mobile processing device 21 are located close to each other or the mobile 11 and the mobile processing device 21 are integrated and a difference between the positions of the mobile 11 and the mobile processing device 21 does not interfere with a process, the position of the mobile 11 and the position of the mobile processing device 21 may not be particularly distinguished.

The control unit 116 performs various controls in the mobile processing device 21.

In the first embodiment, the storage unit 113 stores information on a predetermined control program and parameters thereof. Further, the control unit 116 is configured using a central processing unit (CPU). The control unit 116 performs various controls by the CPU executing the control program stored in the storage unit 113 using the parameters stored in the storage unit 113.

It should be noted that the configuration in which the respective processing units 111 to 116 illustrated in FIG. 2 are included is an example of the mobile processing device 21, and other configurations may be used. For example, functions of the processing units 111 to 116 are remote for convenience of description, but the present invention is not necessarily limited to the configuration illustrated in FIG. 2.

A function of the control unit 116 will be described.

The mobile position information acquisition unit 131 acquires information on the position of the mobile 11 acquired by the position information acquisition unit 115.

The terminal position information acquisition unit 132 acquires information on the position of the terminal device 12. In the first embodiment, the terminal position information acquisition unit 132 acquires the information on the position of the terminal device 12 transmitted from the terminal device 12 to the mobile processing device 21.

The distance information acquisition unit 133 acquires (for example, calculates) information on the distance between the mobile 11 and the terminal device 12 on the basis of the information acquired by the mobile position information acquisition unit 131 and the information acquired by the terminal position information acquisition unit 132. This information on the distance is, for example, information for specifying the distance between the mobile 11 and the terminal device 12.

The mobile position condition acquisition unit 134 acquires information on conditions regarding the position of the mobile 11 (mobile position condition information). In the first embodiment, the mobile position condition information is stored in the storage unit 113 in advance or at any timing. The mobile position condition information, for example, may be stored in the storage unit 113 on the basis of information input from the user or the like by the input unit 111, or may be stored in the storage unit 113 on the basis of to the information input from the terminal device 12 or the like by the communication unit 114.

The distance condition acquisition unit 135 acquires information on a condition regarding the distance between the mobile 11 and the terminal device 12 (distance condition information). In the first embodiment, the distance condition information is stored in the storage unit 113 in advance or at any timing. The distance condition information, for example, may be stored in the storage unit 113 on the basis of information input from the user or the like by the input unit 111, or may be stored in the storage unit 113 on the basis of information input from the terminal device 12 or the like by the communication unit 114.

Here, in the first embodiment, the condition regarding the distance between the mobile 11 and the terminal device 12 (a distance condition) may be used as an example of the condition regarding the relative positional relationship between the mobile 11 and the terminal device 12 (relative positional relationship condition), and the distance condition information may be used as an example of the information on the relative positional relationship condition (relative positional relationship condition information).

The determination unit 136 performs determination as to whether the terminal device 12 performs control regarding the mobile 11.

In the first embodiment, the determination unit 136 determines whether or not to permit the terminal device 12 to perform the control regarding the mobile 11. In this case, for example, when there are a plurality of items of the control regarding the mobile 11, the determination unit 136 may determine an item for which the determination unit 136 permits (or an item for which the determination unit 136 does not permit) the terminal device 12 to perform the control regarding the mobile 11.

The mobile position determination unit 151 performs a determination regarding the position of the mobile 11. In the first embodiment, the mobile position determination unit 151 determines whether the position of the mobile 11 satisfies a condition corresponding to the mobile position condition information (a mobile position condition) on the basis of the information acquired by the mobile position information acquisition unit 131 and the mobile position condition information acquired by the mobile position condition acquisition unit 134.

The distance determination unit 152 performs a determination regarding the distance between the mobile 11 and the terminal device 12. In the first embodiment, the distance determination unit 152 determines whether or not the distance between the mobile 11 and the terminal device 12 satisfies a condition corresponding to the distance condition information (distance condition) on the basis of the information acquired by the distance information acquisition unit 133 and the distance condition information acquired by the distance condition acquisition unit 135.

Here, in the first embodiment, when the mobile position determination unit 151 determines that the mobile position condition is satisfied, and the distance determination unit 152 determines that the distance condition is satisfied, the determination unit 136 determines to permit the terminal device 12 to control the mobile 11. This permission, for example, may be permission for general control (all items of the control) or may be permission for respective items of control.

Further, in the first embodiment, when the mobile position determination unit 151 determines that the mobile position condition is not satisfied, and the distance determination unit 152 determines that the distance condition is not satisfied, the determination unit 136 determines not to permit the terminal device 12 to control the mobile 11. This non-permission (not permitting), for example, may be non-permission for general control (all items of the control) or may be non-permission for respective items of control.

Further, in the first embodiment, when the mobile position determination unit 151 determines that the mobile position condition is satisfied, and the distance determination unit 152 determines that the distance condition is not satisfied, the determination unit 136 determines not to permit the terminal device 12 to control the mobile 11. This non-permission (not permitting), for example, may be non-permission for general control (all items of the control) or may be non-permission for respective items of control.

It should be noted that as another example, the determination unit 136 may determine to permit (or not permit) only control of some of the items for the control regarding the mobile 11 by the terminal device 12, as compared with a case in which both the mobile position condition and the distance condition are satisfied in such a case.

Further, in the first embodiment, when the mobile position determination unit 151 determines that the mobile position condition is not satisfied, and the distance determination unit 152 determines that the distance condition is satisfied, the determination unit 136 determines not to permit the terminal device 12 to control the mobile 11. This non-permission (not permitting), for example, may be non-permission for general control (all items of the control) or may be non-permission for respective items of control.

It should be noted that as another example, the determination unit 136 may determine to permit (or not permit) only control of some of the items for the control regarding the mobile 11 by the terminal device 12, as compared with a case in which both the mobile position condition and the distance condition are satisfied in such a case.

The mobile control unit 137 controls the mobile 11 on the basis of the result of the determination in the determination unit 136.

In the first embodiment, the mobile control unit 137 performs control regarding the mobile 11 according to an instruction (an instruction regarding the mobile 11) that is transmitted from the terminal device 12 to the mobile processing device 21 in a range (for example, all or some of items) permitted by the determination unit 136.

In this case, in the first embodiment, the mobile control unit 137 does not execute performing the control regarding the mobile 11 according to the instruction (the instruction regarding the mobile 11) that is transmitted from the terminal device 12 to the mobile processing device 21 in a range (for example, all or some of items) not permitted by the determination unit 136.

Here, the mobile control unit 137 may perform control for blocking all accesses (or some of the accesses) from the terminal device 12 to the mobile 11 with respect to the terminal device 12 for which all the controls are not permitted by the determination unit 136.

Further, the mobile control unit 137 may perform control to output information on the result of the determination of the determination unit 136 as the control regarding the mobile 11. An aspect of this output may be, for example, an aspect in which information is displayed (output) on a screen. Further, this output may be performed by any device. For example, the output may be performed by one or more of the mobile processing device 21, the terminal device 12, the server device 13, and the like. When this output is performed by a device other than the mobile processing device 21, for example, the mobile processing device 21 transmits an instruction for the output to the device, and the device performs the output in response to the reception of the instruction. When the terminal device 12 or another terminal device is used as the device, the mobile processing device 21 can remotely notify the device of the information on the result of the determination of the determination unit 136.

Further, any information may be used as the content of the output (the information to be output). For example, one or more pieces of information such as control permission, control non-permission, a warning when control has not been permitted, a range of an item or the like for which the control has been permitted, a range of items or the like for which the control has not been permitted, and the like may be used. The warning when the control has not been permitted may include, for example, one or more of a time, the position of the mobile 11, the position of the terminal device 12, a distance between the mobile 11 and the terminal device 12, identification information of the mobile 11, identification information of the terminal device 12, and the like.

It should be noted that although the configuration in which the mobile processing device 21 receives the instruction from the terminal device 12 and executes the control according to the instruction for the mobile 11 has been adopted in the first embodiment, another function of the mobile 11 (that is, a function other than the mobile processing device 21) may receive the instruction from the terminal device 12 and execute the control according to the instruction for the mobile 11 as another configuration example. In this case, suppression of the control may be performed by, for example, the mobile processing device 21 or may be performed by another function of the mobile 11 (that is, a function other than the mobile processing device 21).

In any of the configurations, in the first embodiment, the terminal device 12 can perform control on the mobile 11 in a range in which the mobile processing device 21 permits the terminal device 12.

As another configuration example, a configuration in which when the determination unit 136 does not permit the terminal device 12 to control the mobile 11, the mobile control unit 137 of the mobile processing device 21 notifies a predetermined device of the fact, and permits the terminal device 12 to control the mobile 11 when receiving instructions to permit the control from the predetermined device in response to the notification may be used. The predetermined device may be any device. For example, the predetermined device may be a device owned by, for example, a manager (a person) of the mobile 11.

It should be noted that, for example, a notification using a dedicated application, a notification using e-mail, a notification using a mail of a short message service (SMS), or the like may be used as a notification from a certain device to another device. Further, for example, a destination address of the notification may be set and stored in the storage unit 113 of the mobile processing device 21 in advance. Such notification, for example, may be transmitted directly from the mobile processing device 21 to the predetermined device, or may be transmitted from the mobile processing device 21 to the predetermined device via the network 41, the server device 13, or the like.

[Terminal Device]

Figure 3:
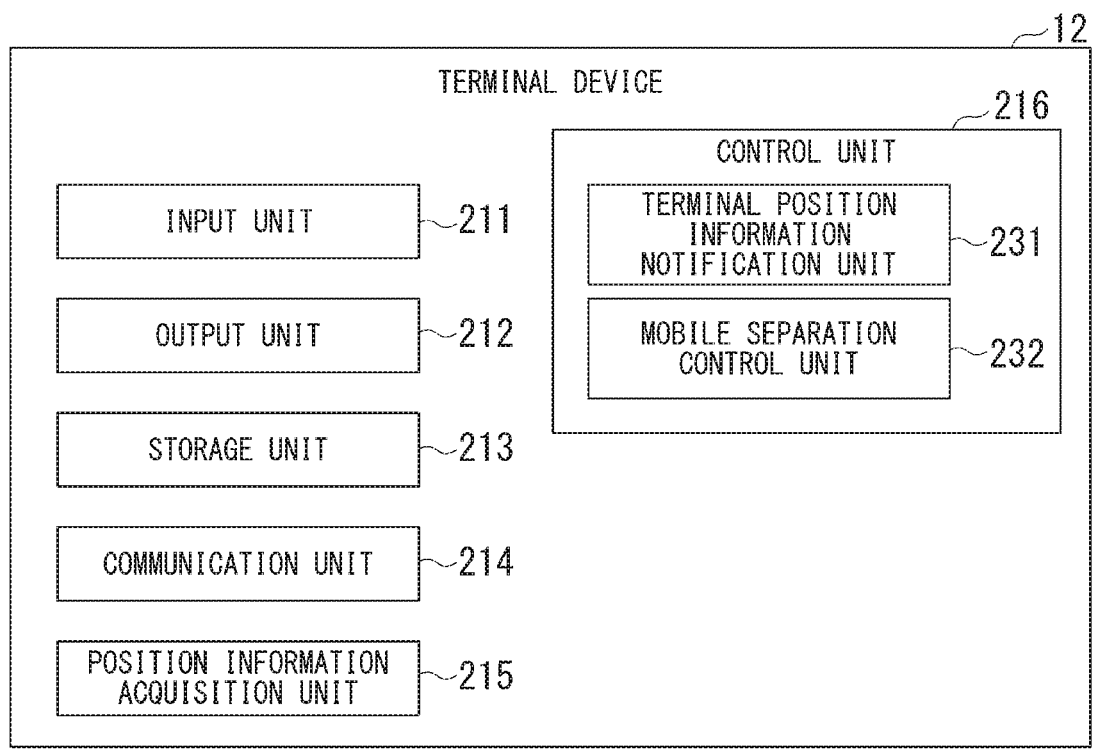
FIG. 3 is a diagram illustrating an example of a schematic configuration of a terminal device according to the embodiment (the first embodiment) of the present invention.

FIG. 3 is a diagram illustrating an example of a schematic configuration of the terminal device 12 according to the first embodiment (the first embodiment) of the present invention.

In the first embodiment, the terminal device 12 is used as a device that performs separation control (remote control) on the mobile 11.

The terminal device 12 includes an input unit 211, an output unit 212, a storage unit 213, a communication unit 214, a position information acquisition unit 215, and a control unit 216.

The control unit 216 includes a terminal position information notification unit 231 and a mobile separation control unit 232.

The input unit 211 receives information from the outside. The input unit 211 includes, for example, an operation unit that receives an operation that is performed by a user (person), and receives information according to the operation received by the operation unit. Further, the input unit 211 is connected to, for example, an external device (for example, a recording medium), and receives information output from the external device.

The output unit 212 outputs information. The output unit 212 includes, for example, a screen, and displays (outputs) information on the screen. The output unit 212 is connected to, for example, an external device (for example, a recording medium), and outputs information to the external device.

The storage unit 213 stores information.

The communication unit 214 communicates information. In the first embodiment, the communication unit 214 wirelessly communicates a signal with the wireless device 32 (which may be the wireless device 31) to communicate information included in the signal.

The position information acquisition unit 215 acquires information on a position of the terminal device 12. The information on the position is, for example, information for specifying the position of the terminal device 12. The position information acquisition unit 215 may have a GPS function as an example and acquire information on the position using this function, or may have another function and acquire the information on the position using the other function.

Here, in the first embodiment, the information acquired by the position information acquisition unit 215 may include, for example, information on a two-dimensional position on a plane such as the ground, or information on a three-dimensional position. As a specific example, the information acquired by the position information acquisition unit 215 may include one or more of latitude and longitude information, azimuth information, and altitude information. It should be noted that the information acquired by the position information acquisition unit 215 may include at least information with which a process that is performed on the basis of the information can be executed.

The control unit 216 performs various controls in the terminal device 12.

In the first embodiment, the storage unit 213 stores information on a predetermined control program and parameters thereof. Further, the control unit 216 is configured using a CPU. The control unit 216 performs various controls by the CPU executing the control program stored in the storage unit 213 using the parameters stored in the storage unit 213.

It should be noted that the configuration in which the respective processing units 211 to 216 illustrated in FIG. 3 are included is an example of the terminal device 12, and other configurations may be used. For example, functions of the processing units 211 to 216 are remote for convenience of description, and the present invention is not necessarily limited to the configuration illustrated in FIG. 3.

A function of the control unit 216 will be described.

The terminal position information notification unit 231 acquires the information on the position of the terminal device 12 acquired by the position information acquisition unit 215, and notifies the mobile processing device 21 of the information. In the first embodiment, the terminal position information notification unit 231 notifies the mobile processing device 21 of the information by transmitting the information to the mobile processing device 21 using the communication unit 214. In this case, the mobile processing device 21 receives the information using the communication unit 114.

The mobile separation control unit 232 transmits the instruction regarding the mobile 11 to the mobile processing device 21. The instruction regarding the mobile 11 is an instruction for requesting control regarding the mobile 11. The instruction may include a required control item. In the first embodiment, the mobile separation control unit 232 transmits the instruction to the mobile processing device 21 by transmitting information indicating the instruction regarding the mobile 11 to the mobile processing device 21 using the communication unit 214. In this case, the mobile processing device 21 receives the information using the communication unit 114 and executes control according to the instruction indicated by the information for the mobile 11 using the mobile control unit 137.

Here, any control may be used as the control regarding the mobile 11. For example, control of the mobile 11 itself may be used, or control of another object related to the mobile 11 may be used. An example of the other object related to the mobile 11 may be an object added to the inside or the outside of the mobile 11.

For example, the control regarding the mobile 11 may be control for each item of the control (content of the control). Any item may be used as the item of the control. For example, switching between ON and OFF of power, switching between any two or more states other than power, execution of a predetermined operation, stopping of a predetermined operation, an increase or decrease in a predetermined level, a setting of speed or acceleration, control regarding stored information, or the like may be used. As an example, when the mobile 11 is a car, items regarding door locking, door unlocking, an accelerator (forward or backward movement), steering, braking, speed, acceleration, lights, bumpers, air conditioning in the car, and a charge state of a battery may be used as the items of the control.

Further, the instruction regarding the mobile 11 may be, for example, an instruction according to content of an operation of the operation unit of the input unit 211 performed by the user, or an instruction set in the terminal device 12 in advance (for example, an instruction based on the information stored in the storage unit 213 in advance).

[Server Device]

Figure 4:
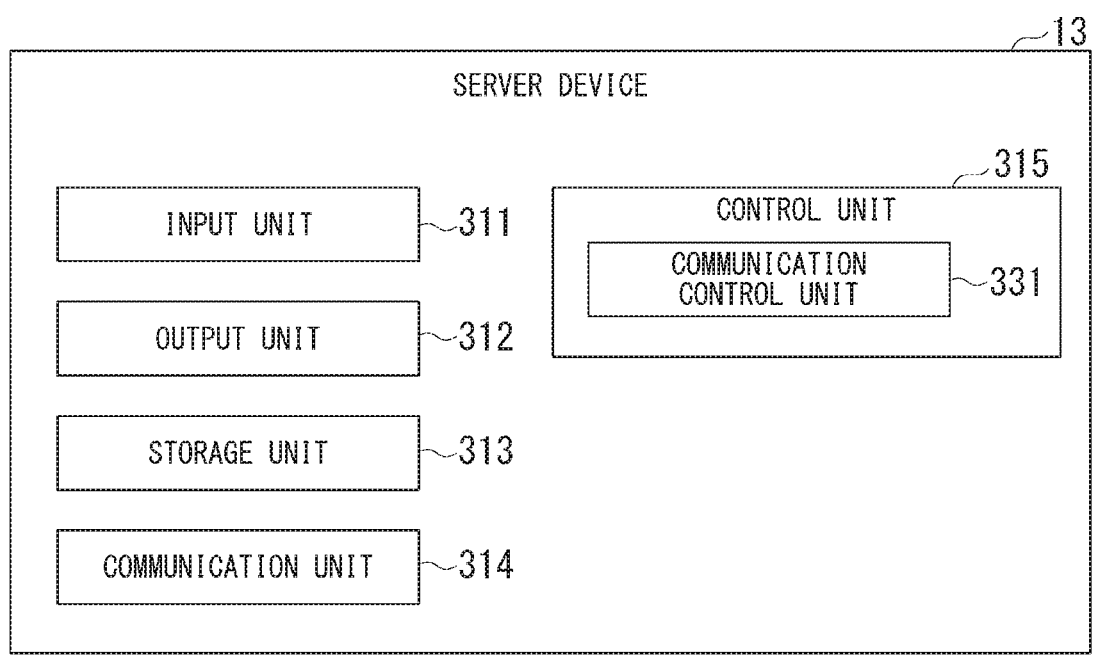
FIG. 4 is a diagram illustrating an example of a schematic configuration of a server device according to the embodiment (the first embodiment) of the present invention.

FIG. 4 is a diagram illustrating an example of a schematic configuration of the server device 13 (an example of the information processing device) according to an embodiment (the first embodiment) of the present invention.

The server device 13 includes an input unit 311, an output unit 312, a storage unit 313, a communication unit 314, and a control unit 315.

The control unit 315 includes a communication control unit 331.

The input unit 311 receives information from the outside. The input unit 311 includes, for example, an operation unit that receives an operation that is performed by a user (person), and receives information according to the operation received by the operation unit. Further, the input unit 311 is connected to, for example, an external device (for example, a recording medium), and receives information output from the external device.

The output unit 312 outputs information. The output unit 312 includes, for example, a screen, and displays (outputs) information on the screen. The output unit 312 is connected to, for example, an external device (for example, a recording medium), and outputs information to the external device.

The storage unit 313 stores information.

The communication unit 314 communicates information. In the first embodiment, the communication unit 314 communicates a signal with the terminal device 12 via the network 41 to communicate information included in the signal. Further, the communication unit 314 communicates a signal with the mobile processing device 21 via the network 41 to communicate information included in the signal.

The control unit 315 performs various controls in the server device 13.

In the first embodiment, the storage unit 313 stores information on a predetermined control program and parameters thereof. Further, the control unit 315 is configured using a CPU. The control unit 315 performs various controls by the CPU executing the control program stored in the storage unit 313 using the parameters stored in the storage unit 313.

It should be noted that the configuration in which the respective processing units 311 to 315 illustrated in FIG. 4 are included is an example of the server device 13, and other configurations may be used. For example, functions of the processing units 311 to 315 are remote for convenience of description, and the present invention is not necessarily limited to the configuration illustrated in FIG. 4.

The function of the control unit 315 will be described.

The communication control unit 331 performs control to transmit a signal received from the terminal device 12 using the communication unit 314, to the mobile processing device 21 using the communication unit 314, and performs control to transmit a signal received from the mobile processing device 21 using the communication unit 314, to the terminal device 12 using the communication unit 314. Accordingly, the communication control unit 331 performs control to relay communication between the terminal device 12 and the mobile processing device 21.

[Mobile Position Condition]

Figure 5:
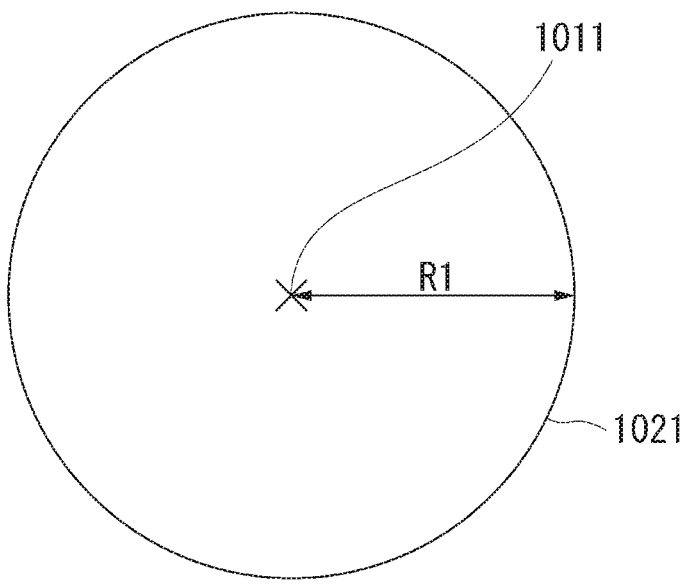
FIG. 5 is a diagram illustrating an example of a mobile position condition according to the embodiment (the first embodiment) of the present invention.

FIG. 5 is a diagram illustrating an example of a mobile position condition according to the first embodiment (the first embodiment) of the present invention.

In the example of FIG. 5, a reference position 1011 of the mobile 11 and a radius R1 are set. An inner range of a circle with the radius R1 around the reference position 1011 of the mobile 11 is set as an allowable range 1021, and a mobile position condition that is regarded as being satisfied when the position of the mobile 11 is in the allowable range 1021 may be used. The reference position 1011 of the mobile 11 may be any position and is, for example, a fixed position. The radius R1 may be any value, and may be, for example, 50 km or 100 km in the first embodiment.

In this case, the mobile position condition information may be, for example, information on the reference position 1011 of the mobile 11 and information on the radius R1, may be information on the allowable range 1021, or may be other information with which the allowable range 1021 can be specified.

In this case, the mobile position determination unit 151 in the mobile processing device 21 determines that the mobile position condition has been satisfied when the position of the mobile 11 is in the allowable range 1021 and determines that the mobile position condition has not been satisfied in other cases.

It should be noted that a boundary line of the allowable range 1021, for example, may be determined to satisfy the condition or may be determined not to satisfy the condition.

Figure 6:
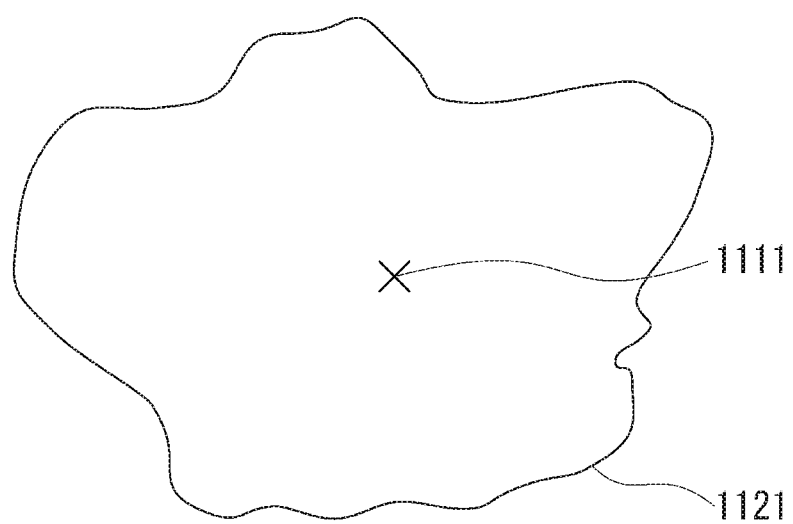
FIG. 6 is a diagram illustrating another example of the mobile position condition according to the embodiment (the first embodiment) of the present invention.

FIG. 6 is a diagram illustrating another example of the mobile position condition according to the first embodiment (the first embodiment) of the present invention.

In the example of FIG. 6, an allowable range 1121 including the reference position 1111 of the mobile 11 is set. The allowable range 1121 may be any range. For example, the allowable range 1121 may be a range of a predetermined area such as a prefecture or a city. The reference position 1111 of the mobile 11 may be any position. For example, the reference position 1111 is a fixed position.

Here, the allowable range 1121 is ascertained to be, for example, a range in which an allowable separation distance is set for each direction (for example, an azimuth of north, south, east, and west) around the reference position 1111 of the mobile 11. That is, a certain allowable separation distance is set for a direction with respect to the reference position 1111 of the mobile 11, and a position at the separation distance or less (or less than the separation distance) is permitted for the direction. The allowable separation distances for the respective directions may be different. For example, when the allowable separation distance for all the directions is constant, the allowable range is circular as in the example of FIG. 5.

A mobile position condition that is regarded as being satisfied when the position of the mobile 11 is in the allowable range 1121 may be used.

In this case, the mobile position condition information, for example, may be information on the reference position 1111 of the mobile 11 and information on the separation distance permitted in each direction, may be information on the allowable range 1121, or may be other information for specifying the allowable range 1121.

In this case, the mobile position determination unit 151 determines that the mobile position condition has been satisfied when the position of the mobile 11 is in the allowable range 1121 and determines that the mobile position condition is not satisfied in other cases.

It should be noted that a boundary line of the allowable range 1121, for example, may be determined to satisfy the condition or may be determined not to satisfy the condition.

Here, in the example of FIG. 6, since the allowable range 1121 can be defined without the information on the reference position 1111 of the mobile, the information on the reference position 1111 of the mobile may not be used.

As another example, a reference range of the mobile 11 may be used instead of the reference position of the mobile 11 in setting the mobile position condition. As the reference range of the mobile 11, any range may be used. For example, a range such as the allowable range 1121 illustrated in FIG. 6 may be used. As the mobile position condition, for example, a condition that is regarded as being satisfied when the position of the mobile 11 is present inside an allowable range may be used, in which a range outside the reference range of the mobile 11, which is a range in which a distance between a boundary line of the reference range of the mobile 11 and the mobile 11 is equal to or smaller than a predetermined distance (or smaller than the predetermined distance) is set as the allowable range. In this case, for the distance between the boundary line of the reference range of the mobile 11 and the mobile 11, for example, a distance to a point at which a distance to the mobile 11 is the shortest (smallest) among arbitrary points on the boundary line may be used.

It should be noted that in this configuration, the allowable range may be, for example, a predetermined range, as in the allowable range 1121 illustrated in FIG. 6.

As another example, any allowable ranges, which are two or more allowable ranges, such as the allowable ranges 1021 and 1121 illustrated in the example of FIG. 5 or the example of FIG. 6, may be set, and a condition that the position of the mobile 11 is in each of all of the two or more allowable ranges may be used as the mobile position condition. In this case, a combination of predetermined numbers of allowable ranges, which are two or more allowable ranges, among a plurality of prepared allowable ranges, can be set as the mobile position condition. In this case, for example, the mobile position condition information includes information indicating an allowable range in which a combination of a predetermined number of allowable ranges are to be performed (that is, information indicating the predetermined number of allowable ranges).

Here, although the mobile position condition (a two-dimensional allowable range) in a case in which an area in which the mobile 11 moves has been ascertained in a planar shape (for example, a case in which a car that is the mobile 11 travels on the ground, the area is captured in a planar map, and an altitude is not considered) has been shown in the example of FIG. 5 and the example of FIG. 6, a mobile position condition in which a three-dimension has been considered may be used as another example. That is, a three-dimensional allowable range may be used as the mobile position condition.

It should be noted that, in the mobile position condition, it may be normally considered that the smaller the allowable range is, the higher the safety is, but the allowable range may be arbitrarily set in consideration of ease of use or the like.

[Distance Condition]

Figure 7:
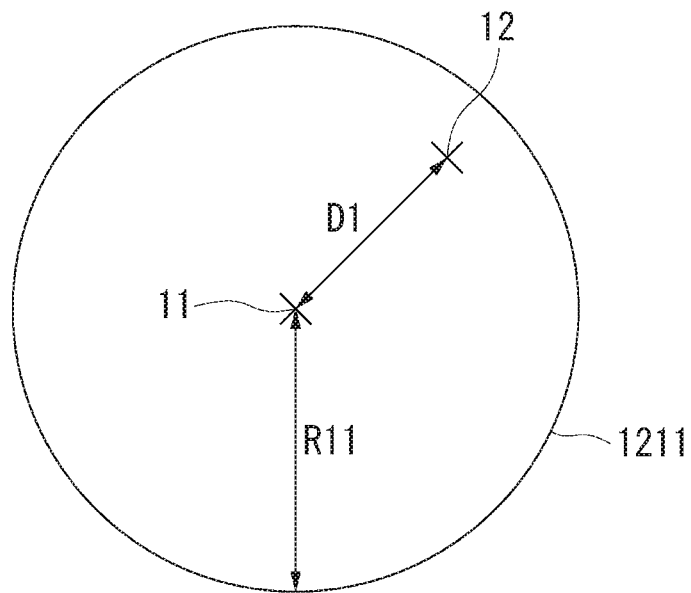
FIG. 7 is a diagram illustrating an example of a distance condition according to the embodiment (the first embodiment) of the present invention.

FIG. 7 is a diagram illustrating an example of the distance condition according to the first embodiment (the first embodiment) of the present invention.

In the example of FIG. 7, a threshold value of a distance (a distance threshold value R11) is set. A range on the inner side of a circle having the position of the mobile 11 as a center and a radius that is the distance threshold value R11 is set as the allowable range 1211, and a distance condition regarded as being satisfied when the position of the terminal device 12 is in the allowable range 1211 may be used. That is, the distance condition is regarded as being satisfied when the distance D1 between the position of the mobile 11 and the position of the terminal device 12 is equal to or smaller than the predetermined distance threshold value R11 (or smaller than the predetermined distance threshold value R11). The position of the mobile 11 can be changed according to the movement of the mobile 11. The distance threshold value R11 may be any value. For example, the distance threshold value R11 may be 1 km or 5 km in the first embodiment.

In this case, the distance condition information is, for example, information on the distance threshold value R11.

In this case, the distance determination unit 152 determines that the distance condition has been satisfied when the distance D1 between the position of the mobile 11 and the position of the terminal device 12 is equal to or smaller than the predetermined distance threshold value R11 (or smaller than the predetermined distance threshold value R11), and determines that the distance condition has not been satisfied in other cases.

It should be noted that a distance matching the distance threshold value R11, for example, may be determined to satisfy the condition or may be determined not to satisfy the condition.

Here, as another example of the distance condition, a threshold value of a distance (a distance threshold value) may be set for each direction around the position of the mobile 11. In this case, the allowable range can be ascertained to be, for example, a range in which a separation distance (a distance threshold value) allowable for each direction (for example, an azimuth such as east, west, north, or south) has been set around the position of the mobile 11. That is, a certain allowable separation distance (distance threshold value) is set for a certain direction with respect to the position of the mobile 11, and a position at the separation distance or less (or less than the separation distance) is allowed in the direction. The separation distances (the distance threshold value) allowed for the respective directions may be different. For example, when the separation distances (distance threshold values) allowed for all the directions are constant, the allowable range becomes circular, as in the example of FIG. 7.

In this case, the distance condition information may be, for example, information on the separation distance (the distance threshold value) that is allowed for each direction with respect to the position of the mobile 11.

Here, although the distance condition (the two-dimensional allowable range) in a case in which an area in which the mobile 11 and the terminal device 12 move has been captured in a planar manner has been shown in the example of FIG. 7, a distance condition in which a three-dimension has been considered may be used as another example. That is, a three-dimensional allowable range may be used as the distance condition.

It should be noted that, in the distance condition, it may be normally considered that the smaller the allowable range is, the higher the safety is, but the allowable range may be arbitrarily set in consideration of ease of use or the like. In particular, for example, when the mobile 1 is a car, it may be considered that the security is enhanced when the allowable range of the distance condition is reduced with respect to the moving car. When there is no distance condition, the mobile 11 present in one country can be controlled by the terminal device 12 present in another country. However, in the first embodiment, when such control is prohibited, such control cannot be allowed.

Further, as an example, in a case in which the allowable range is determined using a distance, a configuration in which the distance of the allowable range in the distance condition is made smaller than the distance of the allowable range in the mobile position condition is a preferred example from the viewpoint of safety.

[Relative Positional Relationship Other than Distance]

Here, although the distance is used as an example of the relative positional relationship between the mobile 11 and the terminal device 12 in the first embodiment, another relative positional relationship other than the distance may be used in another configuration example and, in this configuration, for example, a relative positional relationship condition regarded as being satisfied when the relative positional relationship between the mobile 11 and the terminal device 12 is in a predetermined range (when the relative positional relationship falls within the predetermined range) may be used.

As an example, an altitude may be used as the relative positional relationship between the mobile 11 and the terminal device 12. In this configuration, for example, a relative positional relationship condition that is regarded as being satisfied in a case in which the altitude of the terminal device 12 is smaller than the altitude of the mobile 11 (or the altitude of the terminal device 12 may be equal to or smaller than the altitude of the mobile 11) may be used. This relative positional relationship condition is regarded as being not satisfied in a case in which the altitude of the terminal device 12 is equal to or greater than the altitude of the mobile 11 (or the altitude of the terminal device 12 may exceed the altitude of the mobile 11)

As another example, the altitude and a relative positional relationship other than the altitude may be used as the relative positional relationship between the mobile 11 and the terminal device 12. In this configuration, for example, a relative positional relationship condition that is regarded as being satisfied in a case in which the altitude of the terminal device 12 is smaller than the altitude of the mobile 11 (or the altitude of the terminal device 12 may be equal to or smaller than the altitude of the mobile 11) and the relative positional relationship (for example, a distance in a plane on the ground) other than the altitude is in a predetermined range may be used. This relative positional relationship condition is regarded as being not satisfied in a case in which the altitude of the terminal device 12 is equal to or greater than the altitude of the mobile 11 (or the altitude of the terminal device 12 may exceed the altitude of the mobile 11) and the relative positional relationship between the mobile 11 and the terminal device 12 other than the altitude is not in a predetermined range.

It should be noted that, the case in which the altitude of the terminal device 12 exceeds the altitude of the mobile 11 corresponds to, for example, a case in which the terminal device 12 is present above the mobile 11 (here, something other than the altitude are not considered). Further, a condition for the relative positional relationship other than the altitude may be used, in addition to such an altitude condition.

As another example, an azimuth such as north, south, east, or west may be used as the relative positional relationship between the mobile 11 and the terminal device 12. In this configuration, for example, a relative positional relationship condition regarded as being satisfied when a difference in azimuth between the mobile 11 and the terminal device 12 (for example, an azimuth angle) may be equal to or greater than ±20 degrees (or the difference may exceed ±20 degrees) may be used. In the relative positional relationship condition, the condition is regarded as being not satisfied when the difference in azimuth between the mobile 11 and the terminal device 12 (for example, the azimuth angle) may be smaller than ±20 degrees (or when the difference is equal to or smaller than ±20 degrees). It should be noted that any value may be used as a threshold value (here, 20 degrees). The azimuth may be specified on the basis of, for example, latitude and longitude information.

It should be noted that the above is an example, and for example, the case in which the condition is regarded as being satisfied and the case in which the condition is regarded as being not satisfied may be reversed.

Further, two or more types of relative positional relationships may be used. For example, all conditions may be regarded as being satisfied when at least one of these conditions is satisfied, or all the conditions may be regarded as being satisfied when all the conditions are satisfied.

Thus, in the configuration in which the relative positional relationship between the mobile 11 and the terminal device 12 is used, for example, relative positional relationship condition information is used instead of the distance condition information, the relative information positional relationship information acquisition unit provided instead of the distance information acquisition unit 133 acquires information on the relative positional relationship (relative positional relationship information), the relative positional relationship condition acquisition unit provided instead of the distance condition acquisition unit 135 acquires relative positional relationship condition information, and the relative positional relationship determination unit provided instead of the distance determination unit 152 performs a determination regarding the relative positional relationship.

[Other Conditions]

Further, for example, a condition regarded as being satisfied when the position of the terminal device 12 is in a predetermined allowable range (a terminal device position condition) may be used. In this case, for example, information on the terminal device position condition is stored in the storage unit 113 of the mobile processing device 21 in advance.

The terminal device position condition may be any condition. For example, the terminal device position condition may be the same as the mobile position condition, or may be a condition having a different allowable range from the mobile position condition.

It should be noted that a method of defining the terminal device position condition information may be, for example, the same as a method of defining the mobile position condition information. Specifically, a defining method in which "the position of the mobile 1" in the content of the mobile position condition information is replaced with "the position of terminal device 12" may be used.

For example, when the terminal device position condition is used, the determination unit 136 determines whether or not the terminal device position condition is satisfied, and the mobile control unit 137 performs control not to permit the terminal device 12 to perform control regarding the mobile 11 when the terminal device position condition is not satisfied. This non-permission (not permitting), for example, may be non-permission for general control (all items of the control) or may be non-permission for respective items of control.

Further, for example, a condition regarded as being satisfied when the identification information of the terminal device 12 is predetermined identification information (terminal device condition) may be used. In this case, for example, information on the terminal device condition is stored in the storage unit 113 of the mobile processing device 21 in advance.

In this case, for example, the terminal device 12 transmits the identification information of the terminal device 12 to the mobile processing device 21, and the mobile processing device 21 receives the identification information.

For example, when the terminal device condition is used, the determination unit 136 determines whether or not the terminal device condition is satisfied, and the mobile control unit 137 performs control not to permit the terminal device 12 to perform control regarding the mobile 11 when the terminal device condition is not satisfied.

This non-permission (not permitting), for example, may be non-permission for general control (all items of the control) or may be non-permission for respective items of control.

Thus, by setting the identification information of the terminal device 12 being predetermined identification information as a permission condition, it is possible to prevent the terminal device 12 having fraudulent identification information from performing separation control on the mobile 11 and to improve security.

Here, the number of terminal devices 12 permitted to perform control on one mobile 11, for example, may be one or may two or more.

As a specific example, when the mobile 11 is a car, there are a terminal device carried by an owner of the car, a terminal device carried by a driver other than the owner, and the like, and a configuration in which control is performed on the mobile 11 using such a plurality of terminal devices may be adopted.

Further, for example, a condition (an operation condition) based on information on a history of a past operation performed on the mobile 11 (operation history information) may be used. In this case, for example, the operation history information and information on the operation condition are stored in the storage unit 113 of the mobile processing device 21 in advance.

For example, when the operation condition is used, the determination unit 136 determines whether or not the operation condition is satisfied for content of a current operation, and when the operation condition is not satisfied, the mobile control unit 137 performs control not to permit the terminal device 12 to perform the control regarding the mobile 11. This non-permission (not to permit), for example, may be non-permission for general control (all items of the control) or may be non-permission for respective items of control.

Here, any condition may be used as the operation condition. For example, a condition regarding time (or a time period) in which the operation has been performed, a frequency at which the operation has been performed (for example, a frequency of access), or the like may be used.

For example, a condition that is regarded as being not satisfied when content of a current operation differs from content of the past operation included in the operation history information by a predetermined degree may be used as the operation condition.

When the content of the current operation differs from the content of the past operation included in the operation history information by a predetermined degree, for example, a configuration in which such a determination is performed when a value indicating the content of the current operation is not included in the operation history information (that is, there is no value in the past operation) may be used. As another example, a configuration in which such a determination is performed when the value representing the content of the current operation is remoted by a difference exceeding a predetermined value (or a difference greater than or equal to a predetermined value) from an average value of a value indicating the content of the past operation included in the operation history information (that is, the value is different by a predetermined degree from an average of the past operation) may be used. For example, a value of time or a value of a frequency may be used as the value indicating the content of the operation.

It should be noted that the operation history information may be, for example, information on a history of the separation operation regarding the mobile 11, may be information on a history of the direct operation regarding the mobile 11, or may be both of these. As a specific example, when the mobile 11 is a car, the separation operation is an operation that is performed by the terminal device 12 (or another device for separation control), and the direct operation may be an operation that is performed by a driver (person) who has got in the vehicle.

[Process in Mobile Information Processing System]

Figure 8:
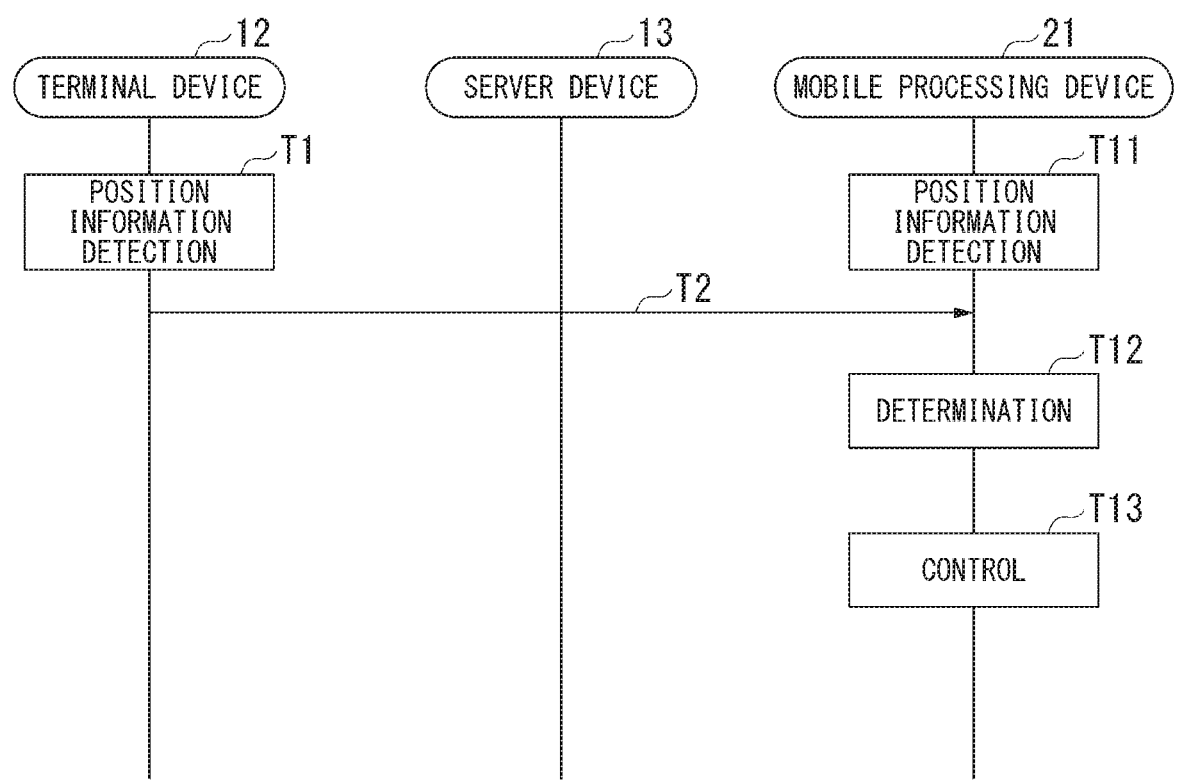
FIG. 8 is a diagram illustrating an example of an overview of a process that is performed in a mobile processing system according to the embodiment (the first embodiment) of the present invention.

FIG. 8 is a diagram illustrating an example of an overview of a process that is performed in the mobile processing system 1 according to an embodiment (a first embodiment) of the present invention.

In the example of FIG. 8, an overview of a process that is performed by each of the terminal device 12, the server device 13, and the mobile processing device 21 is shown. However, in the first embodiment, the server device 13 relays communication, and particularly, the process of the server device 13 is not explicitly shown in the example of FIG. 8.

It should be noted that in this example, respective processes will be described in order for convenience of description, but the present invention is not necessarily limited to the order.

(Process T1)

The terminal device 12 detects and acquires the information on the position of the terminal device 12.

(Process T2)

The terminal device 12 transmits the information to the mobile processing device 21 on the basis of a detection result of the information on the position of the terminal device 12.

Here, a timing at which the information on the position of the terminal device 12 is transmitted from the terminal device 12 to the mobile processing device 21 may be arbitrary. For example, the timing is a timing before the instruction regarding the mobile 11 is transmitted from the terminal device 12 to the mobile processing device 21, may be a timing simultaneous with the transmission of the instruction, or may be a timing after the instruction is transmitted.

Further, a process of transmitting the information on the position of the terminal device 12 from the terminal device 12 to the mobile processing device 21, for example, may be performed spontaneously by the terminal device 12 or may be performed by the terminal device 12 in response to a predetermined request transmitted from the mobile processing device 21 to the terminal device 12.

(Process T11)

The mobile processing device 21 detects and acquires the information on the position of the mobile 11.

(Process T12)

The mobile processing device 21 receives information on the position of the terminal device 12 from the terminal device 12. The mobile processing device 21 performs a determination as to the mobile position condition and the distance condition on the basis of the information on the position of the mobile 11 and the information on the position of the terminal device 12.

(Process T13)

The mobile processing device 21 performs control on the basis of a result of the determination. The control is control regarding whether or not to permit the terminal device 12 to perform control regarding the mobile 11, for example.

Figure 9:
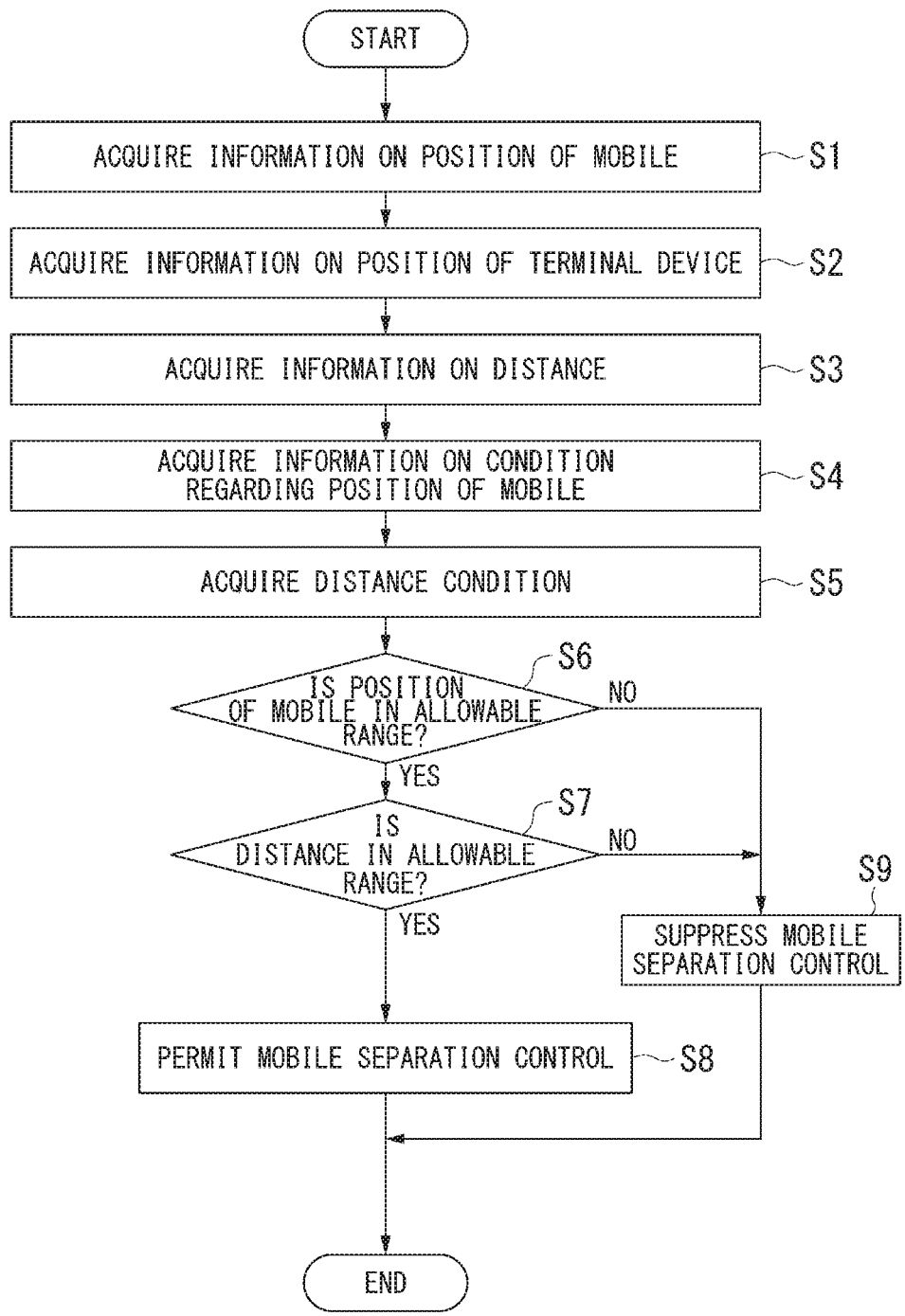
FIG. 9 is a flowchart illustrating an example of a procedure of a process that is performed in the mobile processing device according to the embodiment (the first embodiment) of the present invention.

FIG. 9 is a flowchart illustrating an example of the procedure of a process that is performed by the mobile processing device 21 according to the embodiment (the first embodiment) of the present invention.

It should be noted that in this example, respective processes will be described in order for convenience of description, but the present invention is not necessarily limited to the order.

(Step S1)

The mobile position information acquisition unit 131 acquires the information on the position of the mobile 11. The process proceeds to (step S2).

(Step S2)

The terminal position information acquisition unit 132 acquires information on the position of the terminal device 12. The process proceeds to (step S3).

(Step S3)

The distance information acquisition unit 133 acquires the information on the distance between the mobile 11 and the terminal device 12. The process proceeds to step S4.

(Step S4)

The mobile position condition acquisition unit 134 acquires information on a condition regarding the position of the mobile 11 (the mobile position condition). The process proceeds to step S5.

(Step S5)

The distance condition acquisition unit 135 acquires the information on the condition regarding the distance between the mobile 11 and the terminal device 12 (distance conditions). The process proceeds to step S6.

(Step S6)

The mobile position determination unit 151 determines whether or not the position of the mobile 11 is in the allowable range on the basis of the mobile position condition.

As a result of this determination, when the mobile position determination unit 151 determines that the position of the mobile 11 is in the allowable range (step S6: YES), the process proceeds to (step S7), and otherwise (step S6: NO), the process proceeds to (step S9).

(Step S7)

The distance determination unit 152 determines whether or not the distance between the mobile 11 and the terminal device 12 is in the allowable range on the basis of the distance condition.

As a result of this determination, when the distance determination unit 152 determines that the distance between the mobile 11 and the terminal device 12 is in the allowable range (step S7: YES), the process proceeds to (step S8), and otherwise (step S7: NO), the process proceeds to (step S9).

(Step S8)

The mobile control unit 137 performs control to permit the terminal device 12 to perform the control regarding the mobile 11 in response to satisfaction of both the mobile position condition and the distance condition. The process of this flow ends.

Here, in the process of (step S8), as an aspect in which the control regarding the mobile 11 is permitted, for example, an aspect in which control is permitted for all items may be used, or other aspects may be used.

(Step S9)

The mobile control unit 137 performs control to suppress the terminal device 12 performing the control regarding the mobile 11 in response to non-satisfaction of at least one of the mobile position condition and the distance condition. The process of this flow ends.

Here, in the process of (step S9), as an aspect in which the control regarding the mobile 11 is suppressed, for example, an aspect in which control is not permitted for all items may be used, or other aspects may be used.

Figure 10:
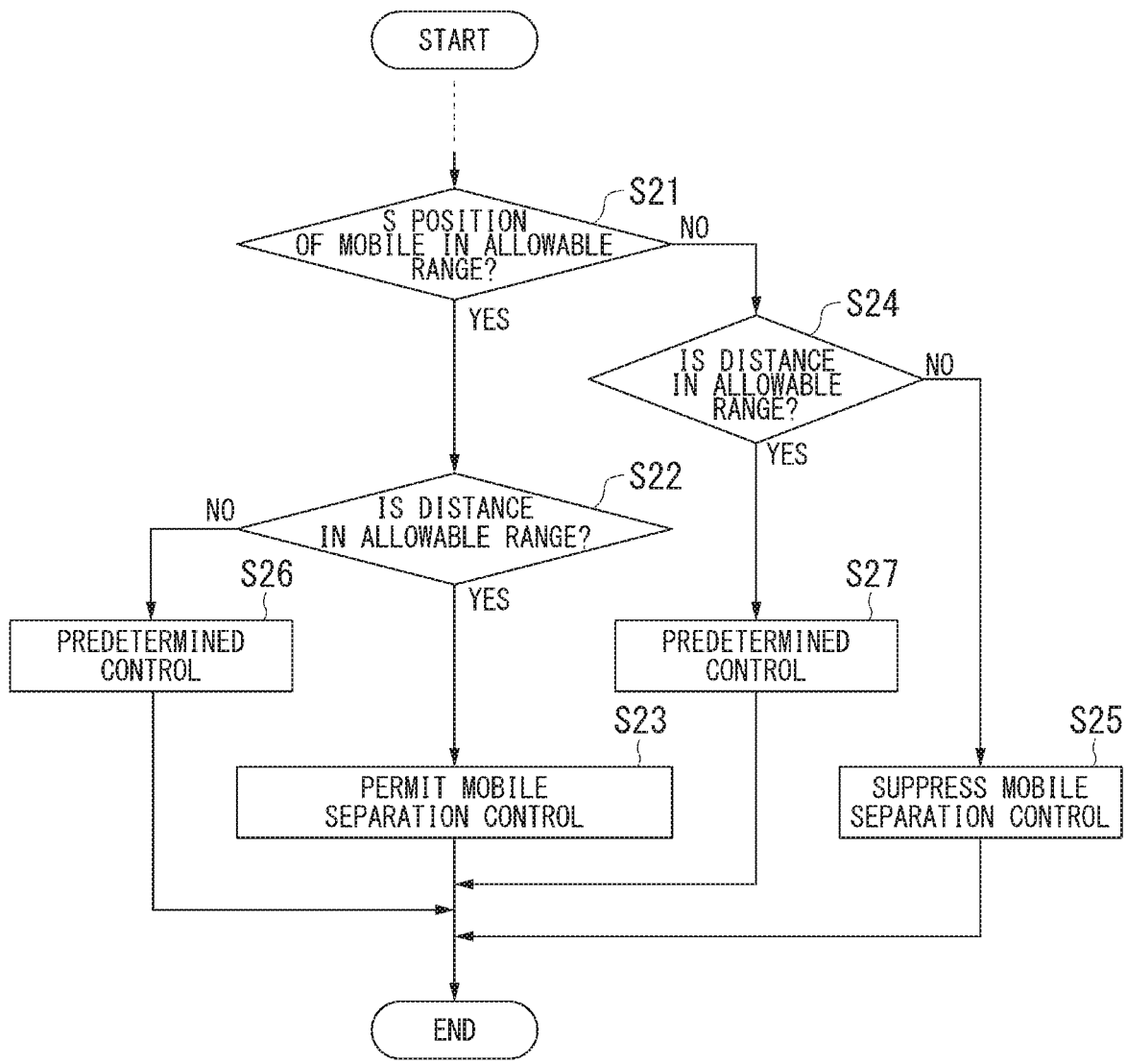
FIG. 10 is a flowchart illustrating another example of the procedure of the process that is performed in the mobile processing device according to the embodiment (the first embodiment) of the present invention.

FIG. 10 is a flowchart illustrating another example of the procedure of the process that is performed in the mobile processing device 21 according to an embodiment (the first embodiment) of the present invention.

In the process of the flowchart in the example of FIG. 10, the mobile processing device 21 performs the same process as processes of (step S1) to (step S5) in the example of FIG. 9 and then performs processes of (step S21) to (step S27) in the example of FIG. 10.

Here, description of the same processes as the processes of (step S1) to (step S5) will be omitted, and the processes of (step S21) to (step S27) will be described.

(Step S21)

The mobile position determination unit 151 determines whether or not the position of the mobile 11 is in the allowable range on the basis of the mobile position condition.

As a result of this determination, when the mobile position determination unit 151 determines that the position of the mobile 11 is in the allowable range (step S21: YES), the process proceeds to a process of (step S22), and otherwise (step S21: NO), the process proceeds to (step S24).

(Step S22)

The distance determination unit 152 determines whether or not the distance between the mobile 11 and the terminal device 12 is in the allowable range on the basis of the distance condition.

As a result of this determination, when the distance determination unit 152 determines that the distance between the mobile 11 and the terminal device 12 is in the allowable range (step S22: YES), the process proceeds to (step S23), and otherwise (step S22: NO), the process proceeds to (step S26).

(Step S23)

The mobile control unit 137 performs control to permit the terminal device 12 to perform the control regarding the mobile 11 in response to satisfaction of both the mobile position condition and the distance condition. The process of this flow ends.

Here, in the process of (step S23), as an aspect in which the control regarding the mobile 11 is permitted, for example, an aspect in which control is permitted for all items may be used, or other aspects may be used.

(Step S24)

The distance determination unit 152 determines whether or not the distance between the mobile 11 and the terminal device 12 is in the allowable range on the basis of the position condition.

As a result of this determination, when the distance determination unit 152 determines that the distance between the mobile 11 and the terminal device 12 is in the allowable range (step S24: YES), the process proceeds to (step S27), and otherwise (step S24: NO), the process proceeds to (step S25).

(Step S25)

The mobile control unit 137 performs control to suppress (for example, not to permit) the terminal device 12 performing the control regarding the mobile 11 in response to non-satisfaction of both the mobile position condition and the distance condition. The process of this process ends.

Here, in the process of (step S25), as an aspect in which the control regarding the mobile 11 is suppressed, for example, an aspect in which control is not permitted for all items may be used, or other aspects may be used.

(Step S26)

In response to satisfaction of the mobile position condition but non-satisfaction of the distance condition, the mobile control unit 137 performs predetermined control associated with this result of the determination. Information on an association between the determination result and the content of the predetermined control is stored in the storage unit 113 in advance. The process of this flow ends.

(Step S27)

In response to the mobile position condition having not been satisfied but the distance condition having been satisfied, the mobile control unit 137 performs predetermined control associated with this result of the determination. Information on an association between the determination result and the content of the predetermined control is stored in the storage unit 113 in advance. The process of this flow ends.

Here, any control may be used as predetermined control according to the fact that the mobile position condition is satisfied but the distance condition is not satisfied, and predetermined control according to the fact that the mobile position condition is not satisfied but the distance condition is satisfied. For example, control for suppressing (for example, not permitting) the terminal device 12 performing control regarding the mobile 11 may be used.

As an aspect for suppressing the control regarding the mobile 11, for example, an aspect in which control for all the items is not permitted may be used or an aspect in which control for some of the items is permitted (or is not permitted) may be used.

Further, the predetermined control according to the fact that the mobile position condition is satisfied but the distance condition is not satisfied, and the predetermined control according to the fact that the mobile position condition is not satisfied but the distance condition is satisfied, for example, may be different controls or may be the same controls.

In the example of FIG. 10, it is possible to perform a maximum of four different types of controls through the process of (step S23), the process of (step S25), the process of (step S26), and the process of (step S27).

Conclusion of First Embodiment

As described above, in the mobile processing system 1 according to the first embodiment, it is possible to improve security when control regarding the mobile 11 is performed by the terminal device 12.

In the mobile processing system 1 according to the first embodiment, for example, it is possible to detect fraudulent access from the terminal device 12 to the mobile 11 (including access likely to be fraudulent in the first embodiment) using the function of the mobile processing device 21.

In the mobile processing system 1 according to the first embodiment, it is possible to improve the security against falsification of the position information, or the like, since a determination is performed as to the mobile position condition regarding the position (an absolute position) of the mobile 11 and a relative positional relationship condition (the distance condition in the first embodiment) regarding the positional relationship (a relative position) between the mobile 11 and the terminal device 12.

Further, in the mobile processing system according to the first embodiment, since the mobile processing device 21 performs the storage of the conditions (the mobile position condition, the distance condition, or the like in the first embodiment), the acquisition of the information on the position of the terminal device 12, the determination, and the control according to the determination result, it is possible to enhance the security, for example, even in a case in which an fraudulent attack can occur on the terminal device 12 or the server device 13.

Further, for example, since the mobile processing device 21 manages the information on the position of the mobile 11 and the information on the position of the terminal device 12, it is possible to reduce a possibility of the information on the position of the mobile 11 leaking to the outside of the mobile 11 and to help privacy protection.

Such a configuration is preferred, for example, in a case in which a likelihood of the terminal device 12 being, for example, stolen and exploited is considered. Normally, the terminal device 12 is used by an authorized user, but there is a possibility of the terminal device 12 being used by an unauthorized user when the terminal device 12 is stolen, for example.

Further, in the mobile processing system 1 according to the first embodiment, since the mobile processing device 21 determines whether or not to permit the control before the mobile 11 is controlled by the terminal device 12, it is possible to prevent the mobile 11 from being fraudulently controlled by the terminal device 12.

A specific example of an effect obtained by the mobile processing system 1 according to the first embodiment is shown.

According to fraudulent access case survey of IoT, or the like, there is a case in which, even when the security of an object (the mobile 11 in the first embodiment) is strong, the object is intruded by impersonating an authorized user by spoofing or the like from a weak part such as authentication from a terminal device (the terminal device 12 in the first embodiment) to a center server device (the sever device 13 in the first embodiment). Therefore, in the mobile processing system 1 according to the first embodiment, it is difficult to be falsified by using both of an allowable range based on a condition regarding the position of the mobile 11 and an allowable range based on a condition regarding the relative positional relationship (the distance in the first embodiment) between the mobile 11 and the terminal device 12. Further, in the mobile processing system 1 according to the first embodiment, for example, it can be considered that the mobile processing system 1 can be realized without a complicated configuration, and the mobile processing system 1 can be realized without a lot of costs.

Here, although the configuration in which predetermined control from the terminal device 12 to the mobile 11 is permitted when both the condition regarding the position of the mobile 11 (the mobile position condition) and the condition regarding the relative positional relationship between the mobile 11 and the terminal device 12 (the condition regarding the distance in the first embodiment) are satisfied has been shown in the first embodiment, a first condition and a second condition can be set as conditions for the permission by the user in some cases in another configuration example. The first condition may be, for example, a condition that both of the mobile position condition and the relative positional relationship condition are satisfied. The second condition may be, for example, a condition that the mobile position condition is satisfied (even when the relative positional relationship condition is not satisfied), or may be a condition that the relative positional relationship condition is satisfied (even when the mobile position condition is not satisfied). The setting by the user may be performed using, for example, an operation unit of an input unit included in a device that performs a determination of the condition (an operation unit of the input unit 111 included in the mobile processing device 21 in the first embodiment) or may be performed using an operation unit of the input unit 211 included in the terminal device 12.

When the setting by the user is performed by the terminal device 12, for example, the terminal device 12 transmits information indicating the content of the setting to the device that performs a determination of the condition (the mobile processing device 21 in the first embodiment) to notify the device of the information. In such a configuration, it is possible to switch between the first condition and the second condition according to a setting performed by the user.

It should be noted that a configuration in which it is possible to set (switch between) three or more types of conditions may be used as another configuration example.

It should be noted that the mobile processing device 21 and the terminal device 12 communicate with each other via the server device 13 in the first embodiment, the mobile processing device 21 and the terminal device 12 may directly communicate as another configuration example. In the direct communication between the mobile processing device 21 and the terminal device 12, for example, wireless communication may be performed. For example, so-called short-range communication may be performed. The direct communication between the mobile processing device 21 and the terminal device 12 may be performed, for example, by the communication unit 114 of the mobile processing device 21 and the communication unit 214 of the terminal device 12.

For direct communication, any wireless communication standard may be used. For example, infrared communication or Bluetooth (registered trademark) communication may be used. Further, for example, wireless communication of a so-called wireless key may be used as the direct communication.

In a case in which the mobile processing device 21 and the terminal device 12 have a direct communication function, a determination can be performed that the mobile processing device 21 and the terminal device 12 are present to be close to each other (at a distance at which the mobile processing device 21 and the terminal device 12 can directly communicate), for example, when the mobile processing device 21 and the terminal device 12 can directly communicate. On the other hand, when the mobile processing device 21 and the terminal device 12 cannot communicate directly, a determination can be performed that the mobile processing device 21 and the terminal device 12 are present to be far away from each other (at distance at which the mobile processing device 21 and the terminal device 12 cannot communicate directly) or that there is an obstacle between the mobile processing device 21 and the terminal device 12.

Further, in any of the communication that is performed between the terminal device 12 and the server device 13 and the communication that is performed between the mobile processing device 21 and the server device 13, communication using encryption may be used or communication without using encryption may be performed.

The mobile processing system 1 according to the first embodiment is not limited to, for example, the case in which the mobile 11 is a car, and may be applied to any mobile 11. Thus, the mobile processing system 1 according to the first embodiment can be widely applied as a security measure for IoT.

As an example, the mobile processing system 1 according to the first embodiment may be applied to home control that can remotely operate an appliance or the like in a home.

Further, although the mobile processing device 21 in the mobile processing system 1 has been described in the first embodiment, a system, method, program or the like having the same gist may be implemented.

Example of Configuration According to First Embodiment

As a configuration example, a processing device (the mobile processing device 21 in the example of FIG. 2) includes a mobile position information acquisition unit (the mobile position information acquisition unit 131 in the example of FIG. 2) that acquires information on a position of a mobile (the mobile 11 in the example of FIG. 1) that is an object movable with its own power (here, the mobile) or power provided from something other than the mobile, a relative positional relationship information acquisition unit (the distance information acquisition unit 133 in the example of FIG. 2) that acquires information on a relative positional relationship (a distance in the first embodiment) between the mobile and a terminal device (the terminal device 12 in the example of FIG. 1), and a determination unit (the determination unit 136 in the example of FIG. 2) that determines whether or not a condition regarding the position of the mobile and a condition regarding the relative positional relationship have been satisfied on the basis of the information acquired by the mobile position information acquisition unit and the information acquired by the relative positional relationship information acquisition unit.

As a configuration example, the processing device includes a control unit (the mobile control unit 137 in the example of FIG. 2) that performs control based on whether or not to permit the terminal device to perform the control regarding the mobile on the basis of a determination result of the determination unit.

As a configuration example, in the processing device, the condition regarding the position of the mobile is a condition that is regarded as being satisfied when the position of the mobile is in a predetermined range, and the condition regarding the relative positional relationship is a condition that is regarded as being satisfied when the relative positional relationship (the distance in the first embodiment) between the mobile and the terminal device is in a predetermined range (smaller than a predetermined threshold value in the first embodiment).

As a configuration example, in the processing device, the relative positional relationship between the mobile and the terminal device is the distance between the mobile and the terminal device.

As a configuration example, a processing method (for example, a method of a process that is performed by the mobile processing device 21) includes acquiring, by a mobile position information acquisition unit, information on a position of a mobile that is an object movable with its own power or power provided from something other than the mobile, acquiring, by a relative positional relationship information acquisition unit, information on a relative positional relationship between the mobile and a terminal device, and determining, by a determination unit, whether or not a condition regarding the position of the mobile and a condition regarding the relative positional relationship have been satisfied on the basis of the information acquired by the mobile position information acquisition unit and the information acquired by the relative positional relationship information acquisition unit.

As a configuration example, a program causes a computer (for example, a computer constituting the mobile processing device 21) to realize a function of acquiring information on a position of a mobile that is an object movable with its own power or power provided from something other than the mobile, a function of acquiring information on a relative positional relationship between the mobile and a terminal device, and a function of determining whether or not a condition regarding the position of the mobile and a condition regarding the relative positional relationship have been satisfied on the basis of the acquired information on the position of the mobile and the acquired information on the relative positional relationship between the mobile and the terminal device.

As a configuration example, a processing device includes a mobile position information acquisition unit that acquires information on a position of a mobile that is an object movable with its own power or power provided from something other than the mobile, a relative positional relationship information acquisition unit that acquires information on a relative positional relationship between a terminal device having a function of transmitting instructions to request control regarding the mobile via another device (for example, a base station device) having a communication function not included in either the processing device or the mobile by communicating with the other device, and the mobile, a determination unit that determines whether or not each of the condition regarding the position of the mobile and the condition regarding the relative positional relationship is satisfied on the basis of the information acquired by the mobile position information acquisition unit and the information acquired by the relative positional relationship information acquisition unit, and determines whether or not to permit the terminal device to perform the control regarding the mobile according to a result of the determination, and a control unit that performs control based on whether or not permit the terminal device to perform the control regarding the mobile on the basis of a result of the determination of the determination unit.

As a configuration example, in the processing device, the instruction to request the control regarding the mobile that is transmitted from the terminal device is transmitted from the terminal device via the Internet or another network (for example, the network 41).

As a configuration example, in the processing device, there are two or more terminal devices capable of performing control on one mobile.

As a configuration example, in the processing device, there are a plurality of items of the control regarding the mobile, and the determination unit determines whether or not to permit the terminal device to perform the control regarding the mobile for each item.

As a configuration example, a processing method that is performed in a processing device includes acquiring, by a mobile position information acquisition unit included in the processing device, information on a position of a mobile that is an object movable with its own power or power provided from something other than the mobile, acquiring, by a relative positional relationship information acquisition unit included in the processing device, information on a relative positional relationship between a terminal device having a function of transmitting instructions to request control regarding the mobile via another device having a communication function not included in either the processing device or the mobile by communicating with the other device, and the mobile, determining, by a determination unit included in the processing device, whether or not each of the condition regarding the position of the mobile and the condition regarding the relative positional relationship is satisfied on the basis of the information acquired by the mobile position information acquisition unit and the information acquired by the relative positional relationship information acquisition unit, and determining whether or not to permit the terminal device to perform the control regarding the mobile according to a result of the determination, and performing, by a control unit included in the processing device, control based on whether or not permit the terminal device to perform the control regarding the mobile on the basis of a result of the determination of the determination unit.

As a configuration example, a program causes a computer constituting a processing device to execute a function of acquiring information on a position of a mobile that is an object movable with its own power or power provided from something other than the mobile, a function of acquiring information on a relative positional relationship between a terminal device having a function of transmitting instructions to request control regarding the mobile via another device having a communication function not included in either the processing device or the mobile by communicating with the other device, and the mobile, a function of determining whether or not each of the condition regarding the position of the mobile and the condition regarding the relative positional relationship is satisfied on the basis of the acquired information on the position of the mobile and the acquired information on the relative positional relationship between the terminal device and the mobile and determining whether or not to permit the terminal device to perform the control regarding the mobile according to a result of the determination, and a function of performing control based on whether or not permit the terminal device to perform the control regarding the mobile on the basis of a result of the determination.

Second Embodiment

[Mobile Processing System]

A schematic configuration of the mobile processing system according to a second embodiment is the same as that of the mobile processing system 1 illustrated in FIG. 1.

Figure 11:
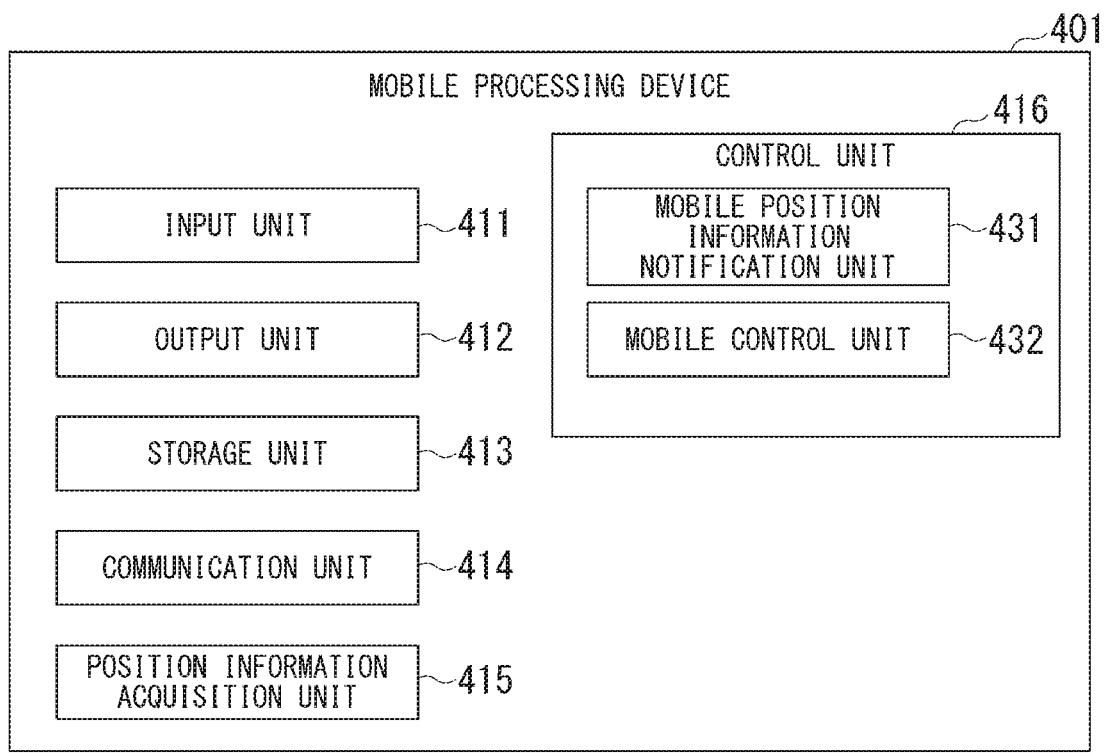
FIG. 11 is a diagram illustrating an example of a schematic configuration of a mobile processing device according to an embodiment (a second embodiment) of the present invention.

In the mobile processing system according to the second embodiment, the mobile processing device 21 illustrated in FIGS. 1 and 2 is replaced with a mobile processing device 401 illustrated in FIG. 11. Further, in the mobile processing system according to the second embodiment, the server device 13 illustrated in FIGS. 1 and 4 is replaced with a server device 501 illustrated in FIG. 12.

The mobile processing system according to the second embodiment is the same as the mobile processing system 1 illustrated in FIG. 1 in the other components, and description thereof will be given using the same reference signs.

The mobile processing system according to the second embodiment, schematically, is different from the mobile processing system 1 according to the first embodiment in that the server device 501 performs the determination and the control regarding the mobile position condition and the distance condition, and is the same in other points.

In the second embodiment, such a difference will be described in detail, and description of the same points will be omitted or simplified.

[Mobile Processing Device]

FIG. 11 is a diagram illustrating an example of a schematic configuration of the mobile processing device 401 according to an embodiment (the second embodiment) of the present invention.

The mobile processing device 401 includes an input unit 411, an output unit 412, a storage unit 413, a communication unit 414, a position information acquisition unit 415, and a control unit 416.

The control unit 416 includes a mobile position information notification unit 431 and a mobile control unit 432.

Functions of the input unit 411, the output unit 412, the storage unit 413, the communication unit 414, and the position information acquisition unit 415 are the same as the input unit 111, the output unit 112, the storage unit 113, the communication unit 114, and the position information acquisition unit 115 illustrated in FIG. 2. It should be noted that, in the second embodiment, the storage unit 413 may not store the mobile position condition information and the distance condition information (information on another condition when the other condition is used).

The control unit 416 performs various controls in the mobile processing device 401.

A function of the control unit 416 will be described.

The mobile position information notification unit 431 acquires the information on the position of the mobile 11 acquired by the position information acquisition unit 415, and notifies the server device 501 of the information. In the second embodiment, the mobile position information notification unit 431 notifies the server device 501 of the information by transmitting the information to the server device 501 using the communication unit 414. In this case, the server device 501 receives the information using the communication unit 514.

The mobile control unit 432 performs control regarding the mobile 11.

In the second embodiment, the mobile control unit 432 performs the control regarding the mobile 11 according to an instruction (an instruction regarding the mobile 11) transmitted from the server device 501 to the mobile processing device 401.

[Terminal Device]

In the second embodiment, schematically, a terminal device 12 that is the same as that illustrated in FIG. 3 is used.

However, in the second embodiment, the terminal position information notification unit 231 acquires information on the position of the terminal device 12 acquired by the position information acquisition unit 215, and notifies the server device 501 of the information. In the second embodiment, the terminal position information notification unit 231 notifies the server device 501 of the information by transmitting the information to the server device 501 using the communication unit 214.

In this case, the server device 501 receives the information using the communication unit 514.

[Server Device]

Figure 12:
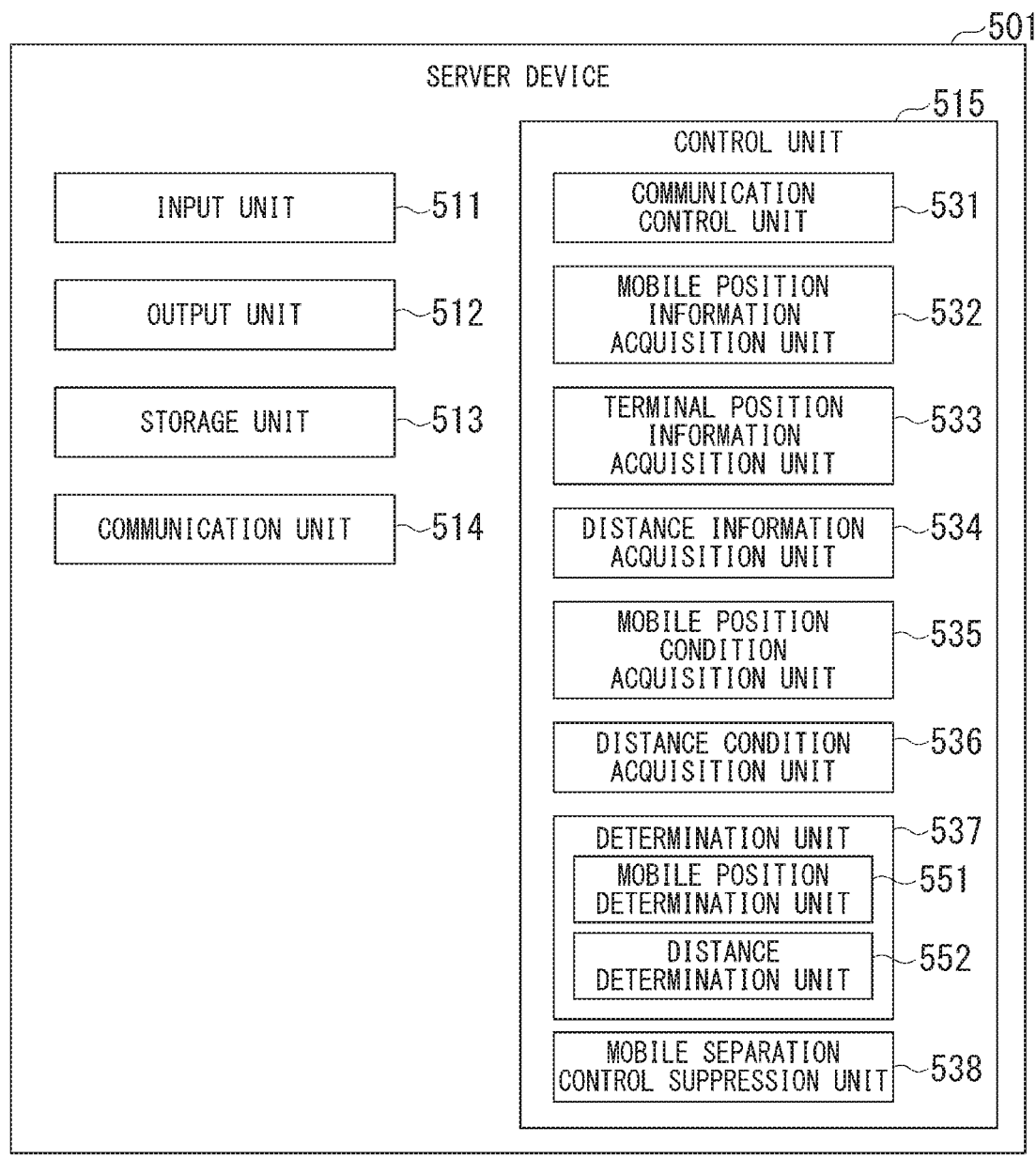
FIG. 12 is a diagram illustrating an example of a schematic configuration of a server device according to the embodiment (the second embodiment) of the present invention.

FIG. 12 is a diagram illustrating an example of a schematic configuration of a server device 501 (an example of an information processing device) according to an embodiment (the second embodiment) of the present invention.

The server device 501 includes an input unit 511, an output unit 512, a storage unit 513, a communication unit 514, and a control unit 515.

The control unit 515 includes a communication control unit 531, a mobile position information acquisition unit 532, a terminal position information acquisition unit 533, a distance information acquisition unit 534, a mobile position condition acquisition unit 535, and a distance condition acquisition unit 536, a determination unit 537, and a mobile separation control suppression unit 538.

The determination unit 537 includes a mobile position determination unit 551 and a distance determination unit 552.

Functions of the input unit 511, the output unit 512, the storage unit 513, and the communication unit 514 are the same as those of the input unit 311, the output unit 312, the storage unit 313, and the communication unit 314 illustrated in FIG. 4.

It should be noted that, in the second embodiment, the storage unit 513 stores mobile position condition information and distance condition information (information on another condition when the other condition is used).

The control unit 515 performs various controls in the server device 501.

The function of the control unit 515 will be described.

The function of the communication control unit 531 is the same as that of the communication control unit 331 illustrated in FIG. 4.

The mobile position information acquisition unit 532 acquires the information on the position of the mobile 11. In the second embodiment, the mobile position information acquisition unit 532 acquires the information on the position of the mobile 11 transmitted from the mobile processing device 21 to the server device 13.

The terminal position information acquisition unit 533 acquires information on the position of the terminal device 12. In the second embodiment, the terminal position information acquisition unit 533 acquires information on the position of the terminal device 12 transmitted from the terminal device 12 to the server device 13.

The distance information acquisition unit 534 acquires (for example, calculates) information on the distance between the mobile 11 and the terminal device 12 on the basis of the information acquired by the mobile position information acquisition unit 532 and the information acquired by the terminal position information acquisition unit 533. The information on this distance is, for example, information for specifying the distance between the mobile 11 and the terminal device 12.

The mobile position condition acquisition unit 535 acquires information on a condition regarding the position of the mobile 11 (mobile position condition information). In the second embodiment, the mobile position condition information is stored in the storage unit 513 in advance or at any timing.

The distance condition acquisition unit 536 acquires information on the condition regarding the distance between the mobile 11 and the terminal device 12 (distance condition information). In the second embodiment, the distance condition information is stored in the storage unit 513 in advance or at any timing.

The determination unit 537 performs a determination as to that the terminal device 12 performs the control regarding the mobile 11.

The mobile position determination unit 551 performs a determination regarding the position of the mobile 11.

The distance determination unit 552 performs a determination regarding the distance between the mobile 11 and the terminal device 12.

The mobile separation control suppression unit 538 performs control to suppress the control regarding the mobile 11, when the terminal device 12 is not permitted to perform the control regarding the mobile 11, on the basis of a result of the determination of the determination unit 537. The permitted control or the non-permitted control, for example, may be control of all ranges (for example, all items) or may be control of some ranges (for example, some of the items).

Here, any method may be used as a method in which the mobile separation control suppression unit 538 suppresses the terminal device 12 performing control regarding the mobile 11.

As an example, the mobile separation control suppression unit 538 may perform control so that information (for example, the information indicating the instruction regarding the mobile 11) addressed to the mobile processing device 401 (or another function of the mobile 11) from the terminal device 12 is not transmitted to the mobile processing device 401 (or another function of the mobile 11) when the information is received from the terminal device 12.

As another example, the mobile separation control suppression unit 538 may transmit information indicating instructions to command the mobile processing device 401 (or another function of the mobile 11) not to permit the instruction from the terminal device 12. In this case, the mobile processing device 401 (or the other function of the mobile 11) performs control not to permit the instruction from the terminal device 12 (the instruction regarding the mobile 11) in response to the reception of the information. In the mobile processing device 401, this control may be performed by the mobile control unit 432.

As another example, the mobile separation control suppression unit 538 may transmits, to the terminal device 12, information indicating instructions to command the mobile processing device 401 (or another function of the mobile 11) not to transmit an instruction regarding the mobile 11. In this case, the terminal device 12 performs control not to send the instruction regarding the mobile 11 according to the reception of the information.

[Condition Regarding Plurality of Mobile Bodies and Plurality of Terminals]

Figures 13, 14:
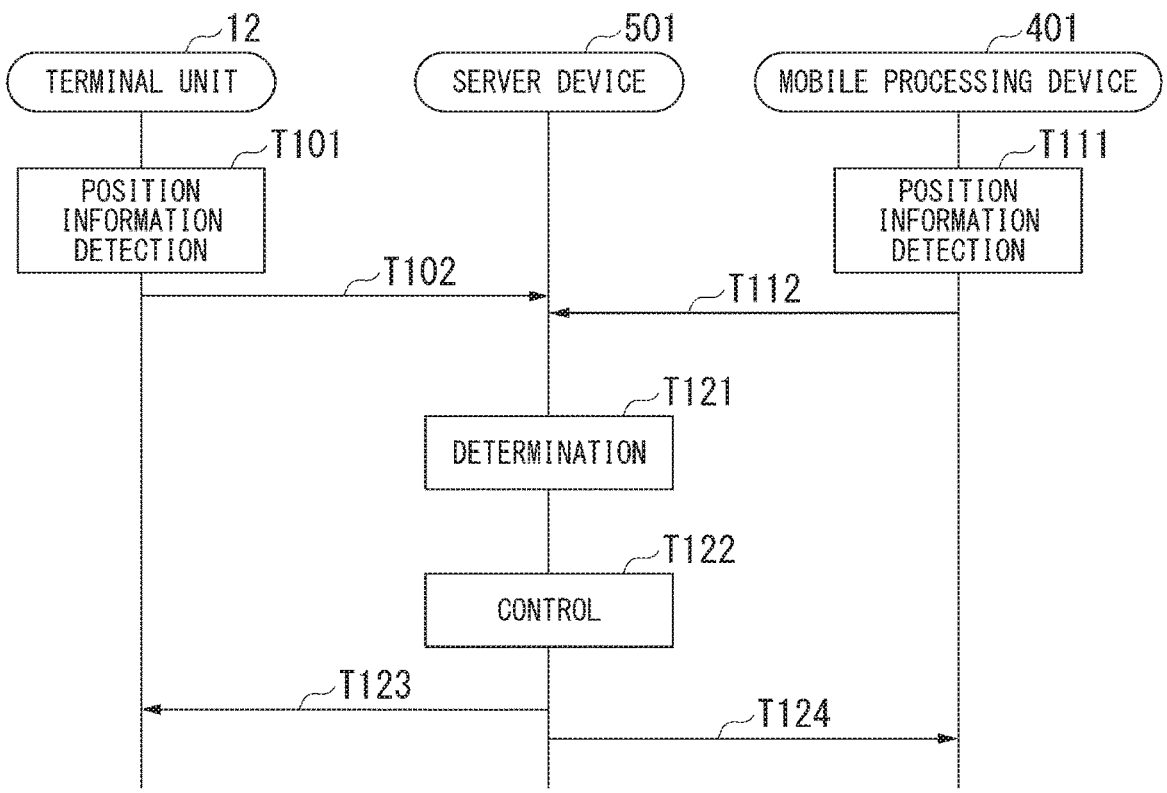
FIG. 13 is a diagram illustrating an example of a condition regarding a plurality of mobile bodies and a plurality of terminal devices according to the embodiment (the second embodiment) of the present invention.
FIG. 14 is a diagram illustrating an example of an overview of a process that is performed in a mobile processing system according to the embodiment (the second embodiment) of the present invention.

FIG. 13 is a diagram illustrating an example of a condition regarding a plurality of mobile bodies 11 and a plurality of terminal devices 12 according to an embodiment (the second embodiment) of the present invention.

FIG. 13 illustrates an example of the information on the condition (condition information 2011).

The condition information 2011 stores identification information (a mobile ID) of the mobile 11, identification information (a terminal ID) of the terminal device 12, a target of the condition (a condition target), and the condition in association with each other. In the example of FIG. 13, the condition target is the position of the mobile or the distance (the distance between the mobile 11 and the terminal device 12).

In a column of a first line in the example of FIG. 13, for a combination of the mobile 11 having a mobile ID "0001" and the terminal device 12 having a terminal ID "0011", condition A1 is set for the position of the mobile 11 and condition B1 is set for the distance. Further, for columns of the other lines in the example of FIG. 13, settings are also as illustrated in FIG. 13.

Here, in the example of FIG. 13, conditions A1 to A3 are mobile position conditions, and conditions B1 to B3 are distance conditions.

In the second embodiment, in the server device 501, the storage unit 513 stores the condition information 2011 illustrated in FIG. 13, and the determination unit 537 (the mobile position determination unit 551 and the distance determination unit 552) can perform a determination suitable for each combination of the mobile 11 and the terminal device 12 using the condition in a column corresponding to each combination of the mobile 11 and the terminal device 12 by referring to the condition information 2011.

Here, the server device 501 receives and acquires the identification information of the terminal device 12 in communication with the terminal device 12, and receives and acquires the identification information of the mobile 11 in communication with the mobile processing device 401 (or another function of the mobile 11).

It should be noted that when the mobile 11 can be specified on the basis of the identification information of the mobile processing device 401, the identification information of the mobile processing device 401 may be used instead of the identification information of the mobile 11.

[Process in Mobile Information Processing System]

FIG. 14 is a diagram illustrating an example of an overview of a process that is performed in the mobile processing system according to an embodiment (second embodiment) of the present invention.

In the example of FIG. 14, an overview of a process that is performed by each of the terminal device 12, the server device 501, and the mobile processing device 401 is shown.

It should be noted that in this example, respective processes will be described in order for convenience of description, but the present invention is not necessarily limited to the order.

(Process T101)
The terminal device 12 detects and acquires the information on the position of the terminal device 12.

(Process T102)
The terminal device 12 transmits the information on the position of the terminal device 12 to the server device 501 on the basis of a detection result of the information on the position of the terminal device 12.

(Process T111)
The mobile processing device 401 detects and acquires the information on the position of the mobile 11.

(Process T112)

The mobile processing device 401 transmits the information to the server device 501 on the basis of a detection result of the information on the position of the mobile 11.

Here, a timing at which the information on the position is transmitted from the terminal device 12 or the mobile processing device 401 to the server device 501 may be arbitrary. For example, the timing is a timing before the instruction regarding the mobile 11 is transmitted from the terminal device 12 to the mobile processing device 401, may be a timing simultaneous with the transmission of the instruction, or may be a timing after the instruction is transmitted.

Further, a process of transmitting the information on the position from the terminal device 12 to the server device 501, for example, may be performed spontaneously by the terminal device 12 or may be performed by the terminal device 12 in response to a predetermined request transmitted from the mobile processing device 401 or the server device 501 to the terminal device 12.

Further, a process of transmitting the information on the position from the mobile processing device 401 to the server device 501, for example, may be performed spontaneously by the mobile processing device 401 or may be performed by the mobile processing device 401 in response to a predetermined request transmitted from the terminal device 12 or the server device 501 to the mobile processing device 401.

(Process T121)

The server device 501 receives the information on the position of the terminal device 12 from the terminal device 12, and receives the information on the position of the mobile 11 from the mobile processing device 401. The server device 501 performs a determination regarding the mobile position condition and the distance condition on the basis of the information on the position.

(Process T122)

The server device 501 performs control on the basis of the result of the determination. The control is, for example, control regarding whether or not to permit the terminal device 12 to perform the control regarding the mobile 11.

(Process T123)

As an example, when the server device 501 does not permit the terminal device 12 to perform the control regarding the mobile 11, the server device 501 transmits a signal for suppressing the control to the terminal device 12. It should be noted that the process T123 is an example and may not necessarily be performed.

(Process T124)

As an example, when the server device 501 does not permit the terminal device 12 to perform the control regarding the mobile 11, the server device 501 transmits a signal for notifying of a warning regarding the fact to the mobile processing device 401. It should be noted that the process T124 is an example and may not necessarily be performed.

Here, the determination (process T121) and the control (process T122) in the server device 501, for example, may be performed spontaneously or may be performed in response to a request from another device.

As an example, the server device 501 may perform the determination (the process T121) and the control (the process T122) spontaneously when it is detected that the instruction regarding the mobile 11 is performed from the terminal device 12 on the basis of a signal from the terminal device 12, a signal from the mobile processing device 401, or the like.

As another example, the terminal device 12 or the mobile processing device 401 may transmit the predetermined request to the server device 501, and the server device 501 may perform the determination (process T121) and the control (process T122) in response to the reception of the request.

Conclusion of Second Embodiment

As described above, in the mobile processing system according to the second embodiment, it is possible to improve security when control regarding the mobile 11 is performed by the terminal device 12.

In the mobile processing system according to the second embodiment, for example, it is possible to detect fraudulent access from the terminal device 12 to the mobile 11 (including access likely to be fraudulent in the second embodiment) using the function of the server device 501.

Here, in the second embodiment, it is possible to obtain the same effects as those of the first embodiment except that the server device 501 performs detection or the like (the determination and the control) of fraudulent access instead of the mobile processing device 21 according to the first embodiment, as compared with the case of the first embodiment.

In the mobile processing system according to the second embodiment, since the server device 501 performs the storage of the conditions (the mobile position condition, the distance condition, or the like in the second embodiment), the acquisition of the information on the position of the terminal device 12, the acquisition of the information on the position of the mobile 11, the determination, and the control according to the determination result, it is possible to enhance the security, for example, even in a case in which an fraudulent attack can occur on the terminal device 12, the mobile processing device 401, or the mobile 11.

Further, in the mobile processing system according to the second embodiment, the server device 501 can collectively manage information for a plurality of terminal devices 12, a plurality of mobile processing devices 401, and a plurality of mobile bodies 11, and can collectively perform control.

Further, although the server device 501 in the mobile processing system has been described in the second embodiment, a system, method, program, or the like having the same gist may be implemented.

Example of Configuration of Second Embodiment

As a configuration example, a processing device (the server device 501 that is an example of the information processing device in the example of FIG. 12) includes a mobile position information acquisition unit (the mobile position information acquisition unit 532 in the example of FIG. 12) that acquires information on a position of a mobile (the mobile 11 in the example of FIG. 1) that is an object movable with its own power (here, the mobile) or power provided from something other than the mobile, a relative positional relationship information acquisition unit (the distance information acquisition unit 534 in the example of FIG. 12) that acquires information on a relative positional relationship (a distance in the second embodiment) between the mobile and a terminal device (the terminal device 12 in the example of FIG. 1), and a determination unit (the determination unit 537 in the example of FIG. 12) that determines whether or not a condition regarding the position of the mobile and a condition regarding the relative positional relationship have been satisfied on the basis of the information acquired by the mobile position information acquisition unit and the information acquired by the relative positional relationship information acquisition unit.

As a configuration example, the processing device includes a control unit (the communication control unit 531 in the example of FIG. 12) that performs control based on whether or not to permit the terminal device to perform the control regarding the mobile on the basis of a determination result of the determination unit.

As a configuration example, in the processing device, the condition regarding the position of the mobile is a condition that is regarded as being satisfied when the position of the mobile is in a predetermined range, and the condition regarding the relative positional relationship is a condition that is regarded as being satisfied when the relative positional relationship (the distance in the second embodiment) between the mobile and the terminal device is in a predetermined range (smaller than a predetermined threshold value in the second embodiment).

As a configuration example, in the processing device, the relative positional relationship between the mobile and the terminal device is the distance between the mobile and the terminal device.

As a configuration example, a processing method (for example, a method of a process that is performed by the server device 501) includes acquiring, by a mobile position information acquisition unit, information on a position of a mobile that is an object movable with its own power or power provided from something other than the mobile, acquiring, by a relative positional relationship information acquisition unit, information on a relative positional relationship between the mobile and a terminal device, and determining, by a determination unit, whether or not a condition regarding the position of the mobile and a condition regarding the relative positional relationship have been satisfied on the basis of the information acquired by the mobile position information acquisition unit and the information acquired by the relative positional relationship information acquisition unit.

As a configuration example, a program causes a computer (for example, a computer constituting the server device 501) to realize a function of acquiring information on a position of a mobile that is an object movable with its own power or power provided from something other than the mobile, a function of acquiring information on a relative positional relationship between the mobile and a terminal device, and a function of determining whether or not a condition regarding the position of the mobile and a condition regarding the relative positional relationship have been satisfied on the basis of the acquired information on the position of the mobile and the acquired information on the relative positional relationship between the mobile and the terminal device.

As a configuration example, a processing device includes a mobile position information acquisition unit that acquires information on a position of a mobile that is an object movable with its own power or power provided from something other than the mobile, a relative positional relationship information acquisition unit that acquires information on a relative positional relationship between a terminal device having a function of transmitting instructions to request control regarding the mobile via another device (for example, a base station device) having a communication function not included in either the processing device or the mobile by communicating with the other device, and the mobile, a determination unit that determines whether or not each of the condition regarding the position of the mobile and the condition regarding the relative positional relationship is satisfied on the basis of the information acquired by the mobile position information acquisition unit and the information acquired by the relative positional relationship information acquisition unit, and determines whether or not to permit the terminal device to perform the control regarding the mobile according to a result of the determination, and a control unit that performs control based on whether or not permit the terminal device to perform the control regarding the mobile on the basis of a result of the determination of the determination unit As a configuration example, in the processing device, the instruction to request the control regarding the mobile that is transmitted from the terminal device is transmitted from the terminal device via the Internet or another network (for example, the network 41).

As a configuration example, in the processing device, there are two or more terminal devices capable of performing control on one mobile.

As a configuration example, in the processing device, there are a plurality of items of the control regarding the mobile, and the determination unit determines whether or not to permit the terminal device to perform the control regarding the mobile for each item.

As a configuration example, a processing method that is performed in a processing device includes acquiring, by a mobile position information acquisition unit included in the processing device, information on a position of a mobile that is an object movable with its own power or power provided from something other than the mobile, acquiring, by a relative positional relationship information acquisition unit included in the processing device, information on a relative positional relationship between a terminal device having a function of transmitting instructions to request control regarding the mobile via another device having a communication function not included in either the processing device or the mobile by communicating with the other device, and the mobile, determining, by a determination unit included in the processing device, whether or not each of the condition regarding the position of the mobile and the condition regarding the relative positional relationship is satisfied on the basis of the information acquired by the mobile position information acquisition unit and the information acquired by the relative positional relationship information acquisition unit, and determining whether or not to permit the terminal device to perform the control regarding the mobile according to a result of the determination, and performing, by a control unit included in the processing device, control based on whether or not permit the terminal device to perform the control regarding the mobile on the basis of a result of the determination of the determination unit.

As a configuration example, a program causes a computer constituting a processing device to execute a function of acquiring information on a position of a mobile that is an object movable with its own power or power provided from something other than the mobile, a function of acquiring information on a relative positional relationship between a terminal device having a function of transmitting instructions to request control regarding the mobile via another device having a communication function not included in either the processing device or the mobile by communicating with the other device, and the mobile, a function of determining whether or not each of the condition regarding the position of the mobile and the condition regarding the relative positional relationship is satisfied on the basis of the acquired information on the position of the mobile and the acquired information on the relative positional relationship between the terminal device and the mobile and determining whether or not to permit the terminal device to perform the control regarding the mobile according to a result of the determination, and a function of performing control based on whether or not permit the terminal device to perform the control regarding the mobile on the basis of a result of the determination.

Third Embodiment

[Mobile Processing System]

A schematic configuration of a mobile processing system according to a third embodiment is the same as that of the mobile processing system 1 illustrated in FIG. 1.

In the mobile processing system according to the third embodiment, the mobile processing device 21 illustrated in FIGS. 1 and 2 is replaced with a mobile processing device 401 illustrated in FIG. 11. Further, in the mobile processing system according to the third embodiment, the terminal device 12 illustrated in FIGS. 1 and 3 is replaced with a terminal device 601 illustrated in FIG. 15.

The mobile processing system according to the third embodiment is the same as the mobile processing system 1 illustrated in FIG. 1 in the other components, and description thereof will be given using the same reference signs. Further, the mobile processing device 401 illustrated in FIG. 11 will be described using the same reference signs as in the second embodiment.

The mobile processing system according to the third embodiment, schematically, is different from the mobile processing system 1 according to the first embodiment in that the terminal device 601 performs the determination and the control regarding the mobile position condition and the distance condition, and is the same in other points.

In the third embodiment, such a difference will be described in detail, and description of the same points will be omitted or simplified.

Here, in the third embodiment, it can be ascertained that the terminal device 601 includes an information processing device having a function of performing the determination regarding the mobile position condition and the distance condition, and the control. In the third embodiment, the function of the information processing device is integrated with the terminal device 601, and the function of the information processing device is realized as the function of the terminal device 601.

[Mobile Processing Device]

In the embodiment, schematically, the mobile processing device 401 that is the same as that illustrated in FIG. 11 is used.

However, in the embodiment, the mobile position information notification unit 431 acquires the information on the position of the mobile 11 acquired by the position information acquisition unit 415, and notifies the terminal device 601 of the information. In the embodiment, the mobile position information notification unit 431 notifies the terminal device 601 of the information by transmitting the information to the terminal device 601 using the communication unit 414. In this case, the terminal device 601 receives the information using the communication unit 614 (see FIG. 15).

[Terminal Device]

Figure 15:
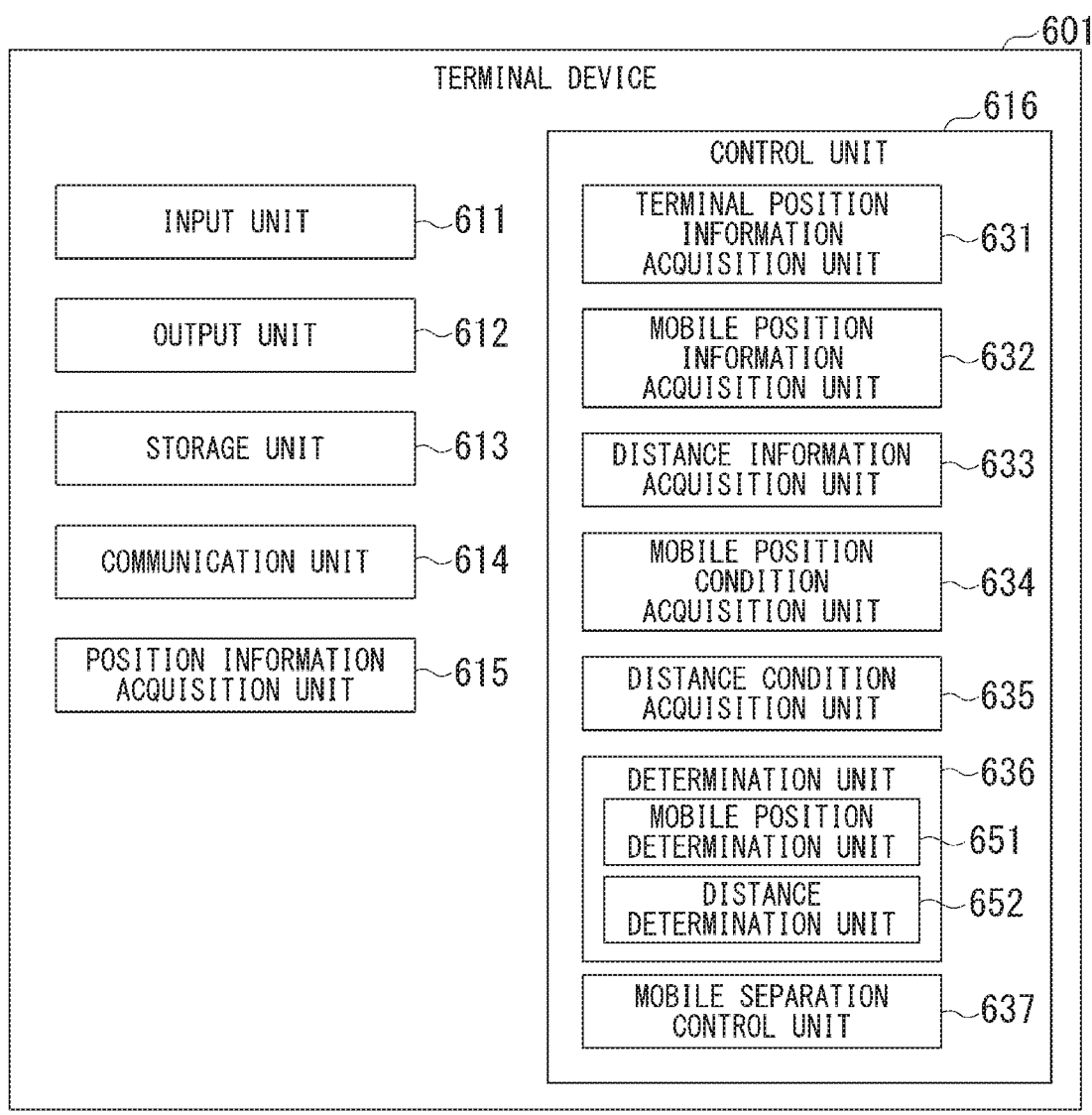
FIG. 15 is a diagram illustrating an example of a schematic configuration of a terminal device according to an embodiment (a third embodiment) of the present invention.

FIG. 15 is a diagram illustrating an example of a schematic configuration of the terminal device 601 according to an embodiment (the third embodiment) of the present invention.

The terminal device 601 includes an input unit 611, an output unit 612, a storage unit 613, a communication unit 614, a position information acquisition unit 615, and a control unit 616.

The control unit 616 includes a terminal position information acquisition unit 631, a mobile position information acquisition unit 632, a distance information acquisition unit 633, a mobile position condition acquisition unit 634, a distance condition acquisition unit 635, and a determination unit 636, and a mobile separation control unit 637.

The determination unit 636 includes a mobile position determination unit 651 and a distance determination unit 652.

Functions of the input unit 611, the output unit 612, the storage unit 613, the communication unit 614, and the position information acquisition unit 615 are the same as those of the input unit 211, the output unit 212, the storage unit 213, the communication unit 214, and the position information acquisition unit 215 illustrated in FIG. 3.

It should be noted that in the embodiment, the storage unit 613 stores the mobile position condition information and the distance condition information (information on another condition when the other condition is used).

The control unit 616 performs various controls in the terminal device 601.

The function of the control unit 616 will be described.

The terminal position information acquisition unit 631 acquires information on the position of the terminal device 601 acquired by the position information acquisition unit 615.

The mobile position information acquisition unit 632 acquires the information on the position of the mobile 11. In the embodiment, the mobile position information acquisition unit 632 acquires the information on the position of the mobile 11 transmitted from the mobile processing device 401 to the terminal device 601.

The distance information acquisition unit 633 acquires (for example, calculates) information on the distance between the mobile 11 and the terminal device 601 on the basis of the information acquired by the terminal position information acquisition unit 631 and the information acquired by the mobile position information acquisition unit 632. This information on the distance is, for example, information for specifying the distance between the mobile 11 and the terminal device 601.

The mobile position condition acquisition unit 634 acquires information on the condition regarding the position of the mobile 11 (mobile position condition information). In the embodiment, the mobile position condition information is stored in the storage unit 613 in advance or at any timing.

The distance condition acquisition unit 635 acquires information on the condition regarding the distance between the mobile 11 and the terminal device 601 (distance condition information). In the embodiment, the distance condition information is stored in the storage unit 613 in advance or at any timing.

The determination unit 636 performs a determination as to that the terminal device 601 performs the control regarding the mobile 11.

The mobile position determination unit 651 performs a determination regarding the position of the mobile 11.

The distance determination unit 652 performs a determination regarding the distance between the mobile 11 and the terminal device 601.

The mobile separation control unit 637 transmits the instruction regarding the mobile 11 to the mobile processing device 401.

The instruction regarding the mobile 11 is instructions to request the control regarding the mobile 11. The instruction may include items of the required control. In the embodiment, the mobile separation control unit 637 transmits the information indicating the instruction regarding the mobile 11 to the mobile processing device 401 using the communication unit 614 to transmit the instruction to the mobile processing device 401. In this case, the mobile processing device 401 receives the information using the communication unit 414, and executes the control according to the instruction indicated by the information for the mobile 11 using the mobile control unit 432.

Further, the mobile separation control unit 637 performs control to suppress the control regarding the mobile 11, when the terminal device 12 is not permitted to perform the control regarding the mobile 11, on the basis of a result of the determination of the determination unit 606. The permitted control or the non-permitted control, for example, may be control of all ranges (for example, all items) or may be control of some of ranges (for example, some of the items).

Here, any method may be used as a method in which the mobile separation control unit 637 suppresses the terminal device 601 performing control regarding the mobile 11.

As an example, the mobile separation control unit 637 may perform control so that the terminal device 601 does not transmit the instruction regarding the mobile 11.

As another example, the mobile separation control unit 637 may perform control so that the terminal device 601 does not transmit information to the mobile processing device 401 (or another function of the mobile 11).

As another example, the mobile separation control unit 637 may transmit information indicating an instruction to command the mobile processing device 401 (or another function of the mobile 11) not to permit the instruction from the terminal device 601. In this case, the mobile processing device 401 (or the other function of the mobile 1) performs control not to permit the instruction from the terminal device 12 (the instruction regarding the mobile 11) in response to the reception of the information. In the mobile processing device 401, this control may be performed by the mobile control unit 432.

[Server Device]

In the embodiment, schematically, the server device 13 that is the same as that illustrated in FIG. 4 may be used.

[Process in Mobile Information Processing System]

Figure 16:
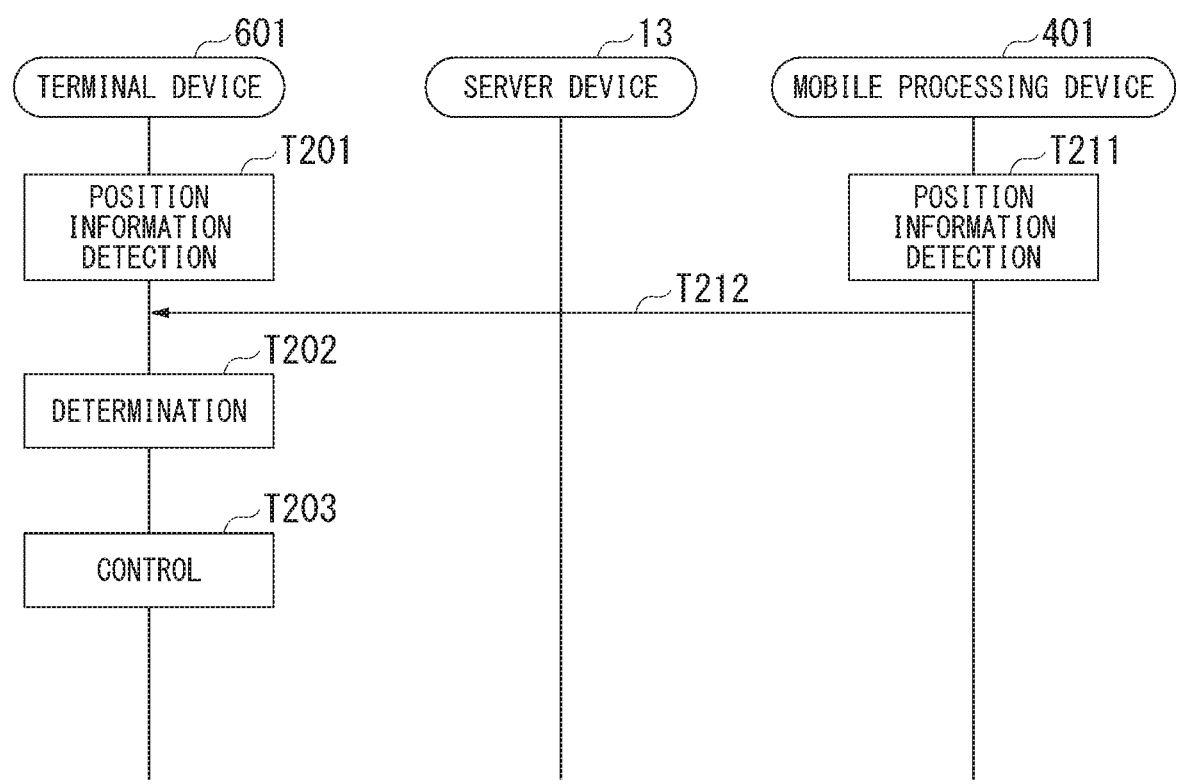
FIG. 16 is a diagram illustrating an example of an overview of a process that is performed in a mobile processing system according to the embodiment (the third embodiment) of the present invention.

FIG. 16 is a diagram illustrating an example of an overview of a process that is performed in the mobile processing system according to an embodiment (the third embodiment) of the present invention.

In the example of FIG. 16, an overview of a process that is performed by each of the terminal device 601, the server device 13, and the mobile processing device 401 is shown. However, in the embodiment, the server device 13 relays communication, and particularly, the process of the server device 13 is not explicitly shown in the example of FIG. 16.

It should be noted that in this example, respective processes will be described in order for convenience of description, but the present invention is not necessarily limited to the order.

(Process T201)

The terminal device 601 detects and acquires the information on the position of the terminal device 601.

(Process T211)

The mobile processing device 401 detects and acquires the information on the position of the mobile 11.

(Process T212)

The mobile processing device 401 transmits the information to the terminal device 601 on the basis of a detection result of the information on the position of the mobile 11.

Here, a timing at which the information on the position of the mobile 11 is transmitted from the mobile processing device 401 to the terminal device 601 may be arbitrary. For example, the timing is a timing before an instruction regarding the mobile 11 is transmitted from the terminal device 601 to the mobile processing device 401, may be a timing simultaneous with the transmission of the instruction, or may be a timing after the instruction is transmitted.

Further, a process of transmitting the information on the position of the mobile 11 from the mobile processing device 401 to the terminal device 601, for example, may be performed spontaneously by the mobile processing device 401 or may be performed by the mobile processing device 401 in response to a predetermined request transmitted from the terminal device 601 to the mobile processing device 401.

(Process T202)

The terminal device 601 receives the information on the position of the mobile 11 from the mobile processing device 401. The terminal device 601 performs a determination as to the mobile position condition and the distance condition on the basis of the information on the position of the terminal device 601 and the information on the position of the mobile 11.

(Process T203)

The terminal device 601 performs control on the basis of a result of the determination. The control is control regarding whether or not to permit the terminal device 601 to perform control regarding the mobile 11, for example.

Conclusion of Third Embodiment

As described above, in the mobile processing system according to the third embodiment, it is possible to improve security when control regarding the mobile 11 is performed by the terminal device 601.

In the mobile processing system according to the third embodiment, for example, it is possible to detect fraudulent access from the terminal device 601 to the mobile 11 (including access likely to be fraudulent in the third embodiment) using the function of the terminal device 601.

Here, in the third embodiment, it is possible to obtain the same effects as those of the first embodiment except that the terminal device 601 performs detection or the like (the determination and the control) of fraudulent access instead of the mobile processing device 21 according to the first embodiment, as compared with the case of the first embodiment.

In the mobile processing system according to the third embodiment, since the terminal device 601 performs the storage of the conditions (the mobile position condition, the distance condition, or the like in the third embodiment), the acquisition of the information on the position of the mobile 11, the determination, and the control according to the determination result, it is possible to enhance the security, for example, even in a case in which an fraudulent attack can occur on the server device 13, the mobile processing device 401, or the mobile 11.

Further, although the server device 501 in the mobile processing system has been described in the third embodiment, a system, method, program, or the like having the same gist may be implemented.

Example of Configuration According to Third Embodiment

As a configuration example, a processing device (the information processing device included in the terminal device 601 in the example of FIG. 15) includes a mobile position information acquisition unit (the mobile position information acquisition unit 632 in the example of FIG. 15) that acquires information on a position of a mobile (the mobile 11 in the example of FIG. 1) that is an object movable with its own power (here, the mobile) or power provided from something other than the mobile, a relative positional relationship information acquisition unit (the distance information acquisition unit 633 in the example of FIG. 15) that acquires information on a relative positional relationship between the mobile and a terminal device (the terminal device 601 in the example of FIG. 15), and a determination unit (the determination unit 636 in the example of FIG. 15) that determines whether or not a condition regarding the position of the mobile and a condition regarding the relative positional relationship have been satisfied on the basis of the information acquired by the mobile position information acquisition unit and the information acquired by the relative positional relationship information acquisition unit As a configuration example, the processing device includes a control unit (the mobile separation control unit 637 in the example of FIG. 15) that performs control based on whether or not to permit the terminal device to perform the control regarding the mobile on the basis of a determination result of the determination unit.

As a configuration example, in the processing device, the condition regarding the position of the mobile is a condition that is regarded as being satisfied when the position of the mobile is in a predetermined range, and the condition regarding the relative positional relationship is a condition that is regarded as being satisfied when the relative positional relationship (the distance in the third embodiment) between the mobile and the terminal device is in a predetermined range (smaller than a predetermined threshold value in the third embodiment).

As a configuration example, in the processing device, the relative positional relationship between the mobile and the terminal device is the distance between the mobile and the terminal device.

As a configuration example, a processing method (for example, a method of a process that is performed by the information processing device included in the terminal device 601) includes acquiring, by a mobile position information acquisition unit, information on a position of a mobile that is an object movable with its own power or power provided from something other than the mobile, acquiring, by a relative positional relationship information acquisition unit, information on a relative positional relationship between the mobile and a terminal device, and determining, by a determination unit, whether or not a condition regarding the position of the mobile and a condition regarding the relative positional relationship have been satisfied on the basis of the information acquired by the mobile position information acquisition unit and the information acquired by the relative positional relationship information acquisition unit.

As a configuration example, a program causes a computer (for example, a computer constituting the information processing device included in the terminal device 601) to realize a function of acquiring information on a position of a mobile that is an object movable with its own power or power provided from something other than the mobile, a function of acquiring information on a relative positional relationship between the mobile and a terminal device, and a function of determining whether or not a condition regarding the position of the mobile and a condition regarding the relative positional relationship have been satisfied on the basis of the acquired information on the position of the mobile and the acquired information on the relative positional relationship between the mobile and the terminal device.

As a configuration example, a processing device includes a mobile position information acquisition unit that acquires information on a position of a mobile that is an object movable with its own power or power provided from something other than the mobile, a relative positional relationship information acquisition unit that acquires information on a relative positional relationship between a terminal device having a function of transmitting an instruction to request control regarding the mobile via another device (for example, a base station device) having a communication function not included in either the processing device or the mobile by communicating with the other device, and the mobile, a determination unit that determines whether or not each of the condition regarding the position of the mobile and the condition regarding the relative positional relationship is satisfied on the basis of the information acquired by the mobile position information acquisition unit and the information acquired by the relative positional relationship information acquisition unit, and determines whether or not to permit the terminal device to perform the control regarding the mobile according to a result of the determination, and a control unit that performs control based on whether or not permit the terminal device to perform the control regarding the mobile on the basis of a result of the determination of the determination unit.

As a configuration example, in the processing device, the instruction to request the control regarding the mobile that is transmitted from the terminal device is transmitted from the terminal device via the Internet or another network (for example, the network 41).

As a configuration example, in the processing device, there are two or more terminal devices capable of performing control on one mobile.

As a configuration example, in the processing device, there are a plurality of items of the control regarding the mobile, and the determination unit determines whether or not to permit the terminal device to perform the control regarding the mobile for each item.

As a configuration example, a processing method that is performed in a processing device includes acquiring, by a mobile position information acquisition unit included in the processing device, information on a position of a mobile that is an object movable with its own power or power provided from something other than the mobile, acquiring, by a relative positional relationship information acquisition unit included in the processing device, information on a relative positional relationship between a terminal device having a function of transmitting an instruction to request control regarding the mobile via another device having a communication function not included in either the processing device or the mobile by communicating with the other device, and the mobile, determining, by a determination unit included in the processing device, whether or not each of the condition regarding the position of the mobile and the condition regarding the relative positional relationship is satisfied on the basis of the information acquired by the mobile position information acquisition unit and the information acquired by the relative positional relationship information acquisition unit, and determining whether or not to permit the terminal device to perform the control regarding the mobile according to a result of the determination, and performing, by a control unit included in the processing device, control based on whether or not permit the terminal device to perform the control regarding the mobile on the basis of a result of the determination of the determination unit.

As a configuration example, a program causes a computer constituting a processing device to execute a function of acquiring information on a position of a mobile that is an object movable with its own power or power provided from something other than the mobile, a function of acquiring information on a relative positional relationship between a terminal device having a function of transmitting an instruction to request control regarding the mobile via another device having a communication function not included in either the processing device or the mobile by communicating with the other device, and the mobile, a function of determining whether or not each of the condition regarding the position of the mobile and the condition regarding the relative positional relationship is satisfied on the basis of the acquired information on the position of the mobile and the acquired information on the relative positional relationship between the terminal device and the mobile and determining whether or not to permit the terminal device to perform the control regarding the mobile according to a result of the determination, and a function of performing control based on whether or not permit the terminal device to perform the control regarding the mobile on the basis of a result of the determination.

Conclusions of Above Embodiments

A program for realizing the functions of the various devices (for example, the mobile processing devices 21 and 401, the terminal devices 12 and 601, and the server devices 13 and 501) according to the above embodiments is recorded (stored) in a computer-readable recording medium (storage medium), and the program recorded on the recording medium is loaded into and executed by the computer system, thereby performing a process.

It should be noted that the "computer system" referred to herein may include an operating system or hardware such as peripheral devices.

Further, the "computer-readable recording medium" refers to a flexible disk, a magneto-optical disc, a writable nonvolatile memory such as a read only memory (ROM) or a flash memory, a portable medium such as a digital versatile disc (DVD), or a storage device such as a hard disk built into the computer system.

Further, the "computer-readable recording medium" may also include a recording medium that holds a program for a short period of time, such as a volatile memory (for example, a DRAM) inside a computer system including a server and a client when the program is transmitted over a network such as the Internet or a communication line such as a telephone line.

Further, the above program may be transmitted from a computer system in which the program is stored in a storage device or the like to another computer system via a transmission medium or by transmission waves in the transmission medium. Here, the "transmission medium" for transmitting the program means a medium having a function of transmitting information, such as a network (communication network) such as the Internet or a communication line such as a telephone line.

Further, the above program may be a program for realizing some of the above-described functions. Furthermore, the above program may be a so-called difference file (a difference program) that can realize the above-described functions in a combination with a program already recorded in the computer system.

It should be noted that although the present invention has been described with reference to the embodiments, the technical scope of the present invention is not limited to the above embodiments. It will be apparent to those skilled in the art that various changes are performed or alternative aspects can be adopted without departing from the spirit and scope of the present invention.

REFERENCE SIGNS LIST

1 Mobile processing system
11: Mobile
12, 601 Terminal device
13, 501 Server device
21, 401 Mobile processing device
31 to 32 Wireless device
41 Network
111, 211, 311, 411, 511, 611 Input unit
112, 212, 312, 412, 512, 612 Output unit
113, 213, 313, 413, 513, 613 Storage unit
114, 214, 314, 414, 514, 614 Communication unit
115, 215, 415, 615 Position information acquisition unit
116, 216, 315, 416, 515, 616 Control unit
131, 532, 632 Mobile position information acquisition unit
132, 533, 631 Terminal position information acquisition unit
133, 534, 633 Distance information acquisition unit
134, 535, 634 Mobile position condition acquisition unit
135, 536, 635 Distance condition acquisition unit
136, 537, 636 Determination unit
137, 432 Mobile control unit
151, 551, 651 Mobile position determination unit
152, 552, 652 Distance determination unit
231: Terminal position information notification unit
232, 637 Mobile separation control unit
331, 531 Communication control unit
431 Mobile position information notification unit
538 Mobile separation control suppression unit
1011, 1111 reference position of mobile
1021, 1121, 1211 Allowable range
2011 Condition information

What is claimed is:

1. A mobile processing device, comprising:
 a mobile controller that controls a remote controllable device, which includes a separate power source for moving the remote controllable device; and
 a determination device that determines relative distance information between the mobile processing device and the remote controllable device, and position location information indicating a position location of the remote controllable device,
 wherein the determination device determines
 (i) based on the relative distance information of a relative distance between the remote controllable device and the mobile processing device, whether the relative distance exceeds a predetermined threshold distance, where the relative distance changes based on movement of one or both of the remote controllable device and the mobile processing device, and
 (ii) based on the position location information of a position location of the remote controllable device, whether the position location exceeds a predetermined allowable distance range from a predetermined fixed reference position, wherein the mobile processing device executes one or more predetermined types of operational control of the remote controllable device based on the determination that the relative distance exceeds the predetermined threshold distance, and on the determination that the position location exceeds the predetermined allowable distance range, wherein the predetermined allowable distance range includes a predetermined maximum allowable altitude within a predetermined shape, and wherein the relative distance information is determined using three-dimensional information, including azimuth information.

2. The mobile processing device according to claim 1, wherein the relative distance information is determined using two-dimensional information.

3. The mobile processing device according to claim 1, wherein the relative distance information is determined using three-dimensional information, including altitude information.

4. The mobile processing device according to claim 1, wherein the predetermined allowable distance range has a circular shape having a predetermined fixed radius in latitude and longitude from the predetermined fixed reference position.

5. The mobile processing device according to claim 4, wherein the predetermined allowable distance range further includes a predetermined variable allowable altitude within the circular shape.

6. The mobile processing device according to claim 1, wherein the predetermined allowable distance range has an irregular shape having a predetermined variable radius in latitude and longitude from the predetermined fixed reference position.

7. The mobile processing device according to claim 6, wherein the predetermined allowable distance range further includes a predetermined maximum allowable altitude within the irregular shape.

8. The mobile processing device according to claim 6, wherein the predetermined allowable distance range further includes a variable maximum allowable altitude within the irregular shape.

9. The mobile processing device according to claim 1, wherein the one or more predetermined types of operational control of the remote controllable device includes general control, non-permission for general control, and non-permission for respective items of control, which provides limited control, of the operation of the remote controllable device.

10. The mobile processing device according to claim 1, wherein the remote controllable device is an automobile.

11. The mobile processing device according to claim 1, wherein the remote controllable device is an unmanned aircraft.

12. The mobile processing device according to claim 1, wherein the remote controllable device is a robot.

13. A method of operating a mobile processing device, comprising:

controlling a remote controllable device that includes a separate power source for moving the remote controllable device;

determining relative distance information of a relative distance between the mobile processing device and the remote controllable device; and determining position location information indicating the position location of the remote controllable device;

wherein determining the relative distance information comprises determining, based on the relative distance information of the relative distance between the remote controllable device and the mobile processing device, whether the relative distance exceeds a predetermined threshold distance, where the relative distance changes based on movement of one or both of the remote controllable device and the mobile processing device, wherein determining the position location information comprises determining, based on the position location information of a position location of the remote controllable device, whether the position location exceeds a predetermined allowable distance range from a predetermined fixed reference position, wherein controlling the remote controllable device comprises executing one or more predetermined types of operational control of the remote controllable device based on the determination that the relative distance exceeds the predetermined threshold distance, and on the determination that the position location exceeds the predetermined allowable distance range, wherein the predetermined allowable distance range includes a predetermined maximum allowable altitude within a predetermined shape, and wherein the relative distance information is determined using three-dimensional information, including azimuth information.

14. A non-transitory computer-readable storage medium that stores one or more computer programs that when executed by a processor performs operations, the operations comprising:

controlling a remote controllable device that includes a separate power source for moving the remote controllable device;

determining relative distance information of a relative distance between the mobile processing device and the remote controllable device; and determining position location information indicating the position location of the remote controllable device;

wherein determining the relative distance information comprises determining, based on the relative distance information of the relative distance between the remote controllable device and the mobile processing device, whether the relative distance exceeds a predetermined threshold distance, where the relative distance changes based on movement of one or both of the remote controllable device and the mobile processing device, and wherein determining the position location information comprises determining, based on the position location information of a position location of the remote controllable device, whether the position location exceeds a predetermined allowable distance range from a predetermined fixed reference position, wherein controlling the remote controllable device comprises executing one or more predetermined types of operational control of the remote controllable device based on the determination that the relative distance exceeds the predetermined threshold distance and on the determination that the position location exceeds the predetermined allowable distance range, wherein the predetermined allowable distance range includes a predetermined maximum allowable altitude within a predetermined shape, and wherein the relative distance information is determined using three-dimensional information, including azimuth information.

\* \* \* \* \*